United States Patent [19]

Kusano

[11] Patent Number: 5,365,511
[45] Date of Patent: Nov. 15, 1994

[54] RELIABLE CROSS-CONNECTION NETWORK

[75] Inventor: Toshihiko Kusano, Tokyo, Japan
[73] Assignee: NEC Corporation, Japan
[21] Appl. No.: 18,027
[22] Filed: Feb. 16, 1993
[30] Foreign Application Priority Data

Feb. 13, 1992 [JP] Japan .................................. 4-26871

[51] Int. Cl.$^5$ .......................... H04Q 1/00; H04Q 11/04
[52] U.S. Cl. ...................................... 370/16; 370/58.1;
340/825.79; 340/825.8; 371/8.1; 371/11.1
[58] Field of Search ........................ 370/16, 54, 14, 56,
370/58.1, 58.2, 58.3, 60, 60.1, 65, 65.5; 340/826,
827, 825.5, 825.79, 825.8; 379/271-273, 279,
284, 291, 292, 334, 335; 371/8.1, 11.1

[56] References Cited

U.S. PATENT DOCUMENTS

| | | | |
|---|---|---|---|
| 4,417,244 | 11/1983 | Melas | 340/825.8 |
| 4,495,615 | 1/1985 | Wilke | 370/58.1 |
| 4,630,045 | 12/1986 | Georgiou | 340/825.79 |
| 4,970,505 | 11/1990 | Hirata et al. | 340/825.8 |
| 4,975,695 | 12/1990 | Almond et al. | 340/825.79 |

*Primary Examiner*—Alpus H. Hsu
*Attorney, Agent, or Firm*—Ostrolenk, Faber, Gerb & Soffen

[57] ABSTRACT

In a cross-connection network including first and second matrix switching units supplied with input digital signals through a branching circuit, first through N-th transmit switching circuits includes primary and secondary first through primary and secondary N-th transmit input terminals connected to primary and secondary first through primary and secondary N-th matrix output terminals of the first and the second matrix switching units, respectively, first through N-th transmit output terminals, and primary and secondary first through primary and secondary N-th abnormal signal detectors, respectively. The transmit switching circuits supply the input digital signals from the primary transmit input terminals to the transmit output terminals, respectively, when the secondary abnormal signal detectors detect abnormalities of the input digital signals, respectively. The transmit switching circuits supply the input digital signals from the secondary transmit input terminals to the transmit output terminals, respectively, when the primary abnormal signal detectors detect abnormalities of the input digital signals, respectively. The transmit switching circuits may supply the input digital signals from the primary transmit input terminals to the transmit output terminals, respectively, when secondary demand data detectors detect switch demand data of the input digital signals that represent failures of matrix switching circuits included in the matrix switching units, respectively. The transmit switching circuits may supply the input digital signals from the secondary transmit input terminals to the transmit output terminals, respectively, when primary switch demand data detectors detect the switch demand data, respectively.

3 Claims, 18 Drawing Sheets

RELIABLE CROSS-CONNECTION NETWORK

BACKGROUND OF THE INVENTION

This invention relates to a cross-connection network comprising first and second matrix switching units.

In the manner which will later be described more in detail, a conventional cross-connection network comprises first through N-th input lines, a branching circuit, first and second matrix switching units, a controller, and first through N-th transmit switching circuits, where N represents an integer greater than one.

The first through the N-th input lines receive first through N-th input digital signals, respectively. The branching circuit has first through N-th input terminals, primary first through primary N-th output terminals, and secondary first through secondary N-th output terminals. The first through the N-th input terminals are connected to the first through the N-th input lines, to the primary first through the primary N-th output terminals, and to the secondary first through the secondary N-th output terminals, respectively.

The first matrix switching unit has primary first through primary N-th matrix input terminals identified by primary input terminal codes, respectively, and primary first through primary N-th matrix output terminals identified by primary output terminal codes, respectively. The first matrix switching unit comprises primary first through primary M-th matrix switching circuits arranged in a plurality of rows and a plurality of columns, where M represents an integer greater than four. The primary first through the primary N-th matrix input terminals are connected to the primary first through the primary N-th output terminals, respectively. The first matrix switching unit selectively connects the primary first through the primary N-th matrix input terminals to the primary first through the primary N-th matrix output terminals.

The second matrix switching unit has secondary first through secondary N-th matrix input terminals identified by secondary input terminal codes, respectively, and secondary first through secondary N-th matrix output terminals identified by secondary output terminal codes, respectively. The second matrix switching unit comprises secondary first through secondary M-th matrix switching circuits arranged in a plurality of rows and a plurality of columns. The secondary first through the secondary N-th matrix input terminals are connected to the secondary first through the secondary N-th output terminals, respectively. The second matrix switching unit selectively connects the secondary first through the secondary N-th matrix input terminals to the secondary first through the secondary N-th matrix output terminals.

The controller comprises a memory and a control unit. The memory memorizes connection information signals indicating, in correspondence to the primary and the secondary input terminal codes, designated ones, not greater in number than N, of the primary output terminal codes and of the secondary output terminal codes. The control unit is connected to the memory and the first and the second matrix switching units. The control unit controls in accordance with the connection information signals the first matrix switching unit to make the first matrix switching unit cross connect the primary first through the primary N-th matrix input terminals to ones of the primary first through the primary N-th matrix output terminals that are identified by the designated ones of the primary output terminal codes. The control unit controls the second matrix switching unit to make the second matrix switching unit cross connect the secondary first through the secondary N-th matrix input terminals to ones of the secondary first through the secondary N-th matrix output terminals that are identified by the designated ones of the secondary output terminal codes.

The first through the N-th transmit switching circuits comprise primary first through primary N-th transmit input terminals, secondary first through secondary N-th transmit input terminals, first through N-th transmit output terminals, primary first through primary N-th abnormal signal detectors, and secondary first through secondary N-th abnormal signal detectors, respectively. The primary first through the primary N-th transmit input terminals are connected to the primary first through the primary N-th matrix output terminals, respectively. The primary first through the primary N-th transmit input terminals receive the first through the N-th input digital signals through the branching circuit and the first matrix switching unit, respectively. The secondary first through the secondary N-th transmit input terminals are connected to the secondary first through the secondary N-th matrix output terminals, respectively. The secondary first through secondary N-th transmit input terminals receive the first through the N-th input digital signals through the branching circuit and the second matrix switching unit, respectively. The primary first through the primary N-th abnormal signal detectors detects primary abnormalities of the first through the N-th input digital signals supplied thereto, respectively. The secondary first through the secondary N-th abnormal signal detectors detects secondary abnormalities of the first through the N-th input digital signals supplied thereto, respectively. All of the first through the N-th transmit switching circuits supply the first through the N-th input digital signals from the primary first through the primary N-th transmit input terminals to the first through the N-th transmit output terminals, respectively, when one of the secondary first through the secondary N-th abnormal detectors detects one of the secondary abnormalities of the first through the N-th input digital signals. All of the first through the N-th transmit switching circuits supply the secondary first through the secondary N-th input digital signals from the secondary first through the secondary N-th transmit input terminals to the first through the N-th transmit output signals, respectively, when one of primary first through the primary N-th abnormal signal detectors detects one of the primary abnormalities of the first through the N-th input digital signals.

It is impossible to use the first matrix switching unit when a failure appears in each of the primary first through the primary M-th matrix switching circuits. It is impossible to use the second matrix switching unit when a failure appears in each of the secondary first through the secondary M-th matrix switching circuits. Consequently, the conventional cross-connection network system is impossible to reliably transmit transmission signals.

SUMMARY OF THE INVENTION

It is therefore an object of this invention to provide a cross-connection network which is capable of reliably transmitting transmission signals.

Other objects of this invention will become clear as the description proceeds.

According to an aspect of this invention, there is provided a cross-connection network which comprises: (A) first through N-th input lines for receiving first through N-th input digital signals, respectively, where N represents an integer greater than one; (B) a branching circuit having first through N-th input terminals, primary first through primary N-th output terminals, and secondary first through secondary N-th output terminals, the first through the N-th input terminals being connected to the first through the N-th input lines, to the primary first through the primary N-th output terminals, and to the secondary first through the secondary N-th output terminals, respectively; (C) a first matrix switching unit having primary first through primary N-th matrix input terminals identified by primary input terminal codes, respectively, and primary first through primary N-th matrix output terminals identified by primary output terminal codes, respectively, the primary first through the primary N-th matrix input terminals being connected to the primary first through the primary N-th output terminals, respectively, the first matrix switching unit being for selectively connecting the primary first through the primary N-th matrix input terminals to the primary first through the primary N-th matrix output terminals; (D) a second matrix switching unit having secondary first through secondary N-th matrix input terminals identified by secondary input terminal codes, respectively, and secondary first through secondary N-th matrix output terminals identified by secondary output terminal codes, respectively, the secondary first through the secondary N-th matrix input terminals being connected to the secondary first through the secondary N-th output terminals, respectively, the second matrix switching unit being for selectively connecting the secondary first through the secondary N-th matrix input terminals to the secondary first through the secondary N-th matrix output terminals; (E) a controller comprising a memory and a control unit, the memory being for memorizing connection information signals indicating, in correspondence to the primary and the secondary input terminal codes, designated ones, not greater in number than N, of the primary output terminal codes and of the secondary output terminal codes, the control unit being connected to the memory and the first and the second matrix switching units for controlling, in accordance with the connection information signals, the first matrix switching unit to make the first matrix switching unit cross connect the primary first through the primary N-th matrix input terminals to ones of the primary first through the primary N-th matrix output terminals that are identified by the designated ones of the primary output terminal codes, the control unit being for controlling the second matrix switching unit to make the second matrix switching unit cross connect the secondary first through the secondary N-th matrix input terminals to ones of the secondary first through the secondary N-th matrix output terminals that are identified by the designated ones of the secondary output terminal codes; and (F) first through N-th transmit switching circuits comprising primary first through primary N-th transmit input terminals, secondary first through secondary N-th transmit input terminals, first through N-th transmit output terminals, primary first through primary N-th abnormal signal detectors, and secondary first through secondary N-th abnormal signal detectors, respectively, the primary first through the primary N-th transmit input terminals being connected to the primary first through the primary N-th matrix output terminals, respectively, for receiving the first through the N-th input digital signals through the branching circuit and the first matrix switching unit, respectively, the secondary first through the secondary N-th transmit input terminals being connected to the secondary first through the secondary N-th matrix output terminals, respectively, for receiving the first through the N-th input digital signals through the branching circuit and the second matrix switching unit, respectively, the primary first through the primary N-th abnormal signal detectors being for detecting primary abnormalities of the first through the N-th input digital signals supplied thereto, respectively, the secondary first through the secondary N-th abnormal signal detectors being for detecting secondary abnormalities of the first through the N-th input digital signals supplied thereto, respectively, the first through the N-th transmit switching circuits being for supplying the first through the N-th input digital signals from the primary first through the primary N-th transmit input terminals to the first through the N-th transmit output terminals, respectively, when the secondary first through the secondary N-th abnormal detectors detect the secondary abnormalities of the first through the N-th input digital signals, respectively, the first through the N-th transmit switching circuits being for supplying the secondary first through the secondary N-th input digital signals from the secondary first through the secondary N-th transmit input terminals to the first through the N-th transmit output signals, respectively, when the primary first through the primary N-th abnormal signal detectors detect the primary abnormalities of the first through the N-th input digital signals, respectively.

According to another aspect of this invention, there is provided a cross-connection network which comprises: (A) first through N-th input lines for receiving first through N-th input digital signals, respectively, where N represents an integer greater than one, each of the first through the N-th input digital signals comprising transmission data bit fields and blank bit fields, wherein the blank bit fields comprising blank bits representative of zero values and periodically appearing in each of the first through the N-th input digital signals: (B) a branching circuit having first through N-th input terminals, primary first through primary N-th output terminals, and secondary first through secondary N-th output terminals, the first through the N-th input terminals being connected to the first through the N-th input lines, to the primary first through the primary N-th output terminals, and to the secondary first through the secondary N-th output terminals, respectively; (C) a first matrix switching unit having primary first through primary N-th matrix input terminals identified by primary input terminal codes, respectively, and primary first through primary N-th matrix output terminals identified by primary output terminal codes, respectively, and comprising primary first through primary M-th matrix switching circuits arranged in a plurality of rows and a plurality of columns, the primary first through the primary N-th matrix input terminals being connected to the primary first through the primary N-th output terminals, respectively, the first matrix switching unit being for selectively connecting the primary first through the primary N-th matrix input terminals to the primary first through the primary N-th matrix output terminals, where M represents an integer greater than four; (D) a second matrix switching unit having secondary first through secondary N-th matrix input terminals identified by secondary input terminals codes, respectively, and secondary first through secondary N-th matrix output terminals identified by secondary output terminals codes, respectively, and comprising secondary first through secondary M-th matrix switching circuits arranged in a plurality of rows and a plurality of columns, the secondary first through the secondary N-th matrix input terminals being connected to the secondary first through the secondary N-th output terminals, respectively, the second matrix switching unit being for selectively connecting the secondary first through the secondary N-th matrix input terminals to the secondary first through the secondary N-th matrix output terminals; (E) a controller comprising a memory and a control unit, the memory being for memorizing connection information signals indicating, in correspondence to the primary and the secondary input terminal codes, designated ones, not greater in number than N, of the primary output terminal codes and of the secondary output terminals codes, the control unit being connected to the memory and the first and the second matrix switching units for controlling, in accordance with the connection information signals, the first matrix switching unit to make the first matrix switching unit cross connect the primary first through the primary N-th matrix input terminals to ones of the primary first through the primary N-th matrix output terminals that are identified by the designated ones of the primary output terminals codes, the control unit being for controlling the second matrix switching unit to make the second matrix switching unit cross connect the secondary first through the secondary N-th matrix input terminals to ones of the secondary first through the secondary N-th matrix output terminals that are identified by the designated ones of the secondary output terminal codes; (F) primary first through primary M-th switch failure detectors connected to the primary first through the primary M-th matrix switching circuits, respectively, for detecting failures of the primary first through the primary M-th matrix switching circuits to produce primary first through primary M-th switch failure signals, respectively; (G) primary first through primary M-th switch demand data generators connected to the primary first through the primary M-th switch failure detectors, respectively, for generating primary first through primary M-th switch demand data, respectively, when the primary first through the primary M-th switch demand data generators are supplied with the primary first through the primary M-th switch failure signals, respectively; (H) a primary processing unit comprising primary first through primary M-th processing circuits connected to the primary first through the primary M-th switch demand data generators, respectively, arranged equivalently along the primary rows between two adjacent ones of the primary first columns and cross-connected to the primary first through the primary M-th matrix switching circuits, the primary first through the primary M-th processing circuits being for processing the first through the N-th input digital signals into primary first through primary N-th processed signals by inserting the primary first through the primary M-th switch demand data into the blank bit fields of the first through the N-th input digital signals, respectively, when the primary first through the primary M-th processing circuits are supplied with the primary first through the primary M-th switch demand data, the primary first through the primary M-th processing circuits being for processing the first through the N-th input digital signals into the primary first through the primary N-th processed signals by inserting zero data representative of the zero values into the blank bit fields of the first through the N-th input digital signals, respectively, when the primary first through the primary M-th switch demand data generators do not generate the primary first through the primary M-th switch demand data, respectively; (I) secondary first through secondary M-th switch failure detectors connected to the secondary first through the secondary M-th matrix switching circuits, respectively, for detecting failures of the secondary first through the secondary M-th matrix switching circuit to produce secondary first through secondary M-th switch failure signals, respectively; (J) secondary first through secondary M-th switch demand data generators connected to the secondary first through the secondary M-th switch failure detectors, respectively, for generating secondary first through secondary M-th switch demand data, respectively, when the secondary first through the secondary M-th switch demand data generators are supplied with the secondary first through the secondary M-th switch failure signals, respectively; (K) a secondary processing unit comprising secondary first through secondary M-th processing circuits connected to the secondary first through the secondary M-th switch demand data generators, respectively, arranged equivalently along the primary rows between two adjacent ones of the primary first columns and cross-connected to the primary first through the primary M-th matrix switching circuits, the secondary first through the secondary M-th processing circuits being for processing the first through the N-th input digital signals into secondary first through secondary N-th processed signals by inserting the secondary first through the secondary M-th switch demand data into the blank bit fields of the first through the N-th input digital signals, respectively, when the secondary first through the secondary M-th processing circuits are supplied with the secondary first through the primary M-th switch demand data, the secondary first through the secondary M-th processing unit being for processing the first through the N-th input digital signals into the secondary first through the secondary N-th processed signals by inserting zero data representative of the zero values into the blank bit fields of the first through the N-th input digital signals, respectively, when the secondary first through the secondary M-th switch demand data generators do not generate the secondary first through the secondary M-th switch demand data, respectively; and (L) first through N-th transmit switching circuits comprising primary first through primary N-th transmit input terminals, secondary first through secondary N-th transmit input terminals, first through N-th transmit output terminals, primary first through primary N-th abnormal signal detectors, secondary first through secondary N-th abnormal signal detectors, primary first through primary N-th switch demand data detectors, and secondary first through secondary N-th switch demand data detectors, the primary first through the primary N-th transmit input terminals being connected to the primary first through the primary N-th matrix output terminals, respectively, for receiving the primary first through the primary N-th processed signals through the primary processing unit, respectively, the secondary first through the secondary N-th transmit input terminals being connected to the secondary first through the secondary N-th matrix output terminals, respectively, for receiving the secondary first through the secondary N-th processed signals through the secondary processing unit, respectively, the primary first through the primary N-th abnormal signal detectors being for detecting primary abnormalities of the primary first through the primary N-th processed signals, respectively, the secondary first through the secondary N-th abnormal detectors being for detecting secondary abnormalities of the secondary first through the secondary N-th processed signals, respectively, the primary first through the primary N-th demand data detectors being for detecting the primary first through the primary N-th switch demand data of the primary first through the primary N-th processed signals, respectively, the secondary first through the secondary N-th switch demand data detectors being for detecting the secondary first through the secondary N-th switch demand data of the secondary first through the secondary N-th processed signals, respectively, the first through the N-th transmit switching circuits being for supplying the primary first through the primary N-th processed signals to the first through the N-th transmit terminals, respectively, in at least one of cases where the secondary first through the secondary N-th abnormal signal detectors detect the secondary abnormalities of the secondary first through the secondary N-th processed signals, respectively, and where the secondary first through the secondary N-th switch demand data detectors detect the secondary first through the secondary N-th switch demand data, respectively, the first through the N-th transmit switching circuits being for supplying the secondary first through the secondary N-th processed signals to the first through the N-th transmit output terminals, respectively, in at least one of cases where the primary first through the primary N-th abnormal signal detectors detect the primary abnormalities of the primary first through the primary N-th processed signals, respectively, and where the primary first through the primary N-th switch demand data detectors detect the primary first through the primary N-th switch demand data, respectively.

According to still another aspect of this invention, there is provided a cross-connection network which comprises: (A) first through N-th input lines for receiving first through N-th input digital signals, respectively, where N represents an integer greater than one, each of the first through the N-th input digital signals comprising transmission data bit fields and blank bit fields, wherein the blank bit fields comprising blank bits representative of zero values and periodically appearing in each of the first through the N-th input digital signals; (B) a branching circuit having first through N-th input terminals, primary first through primary N-th output terminals, and secondary first through secondary N-th output terminals, the first through the N-th input terminals being connected to the first through the N-th input lines, to the primary first through the primary N-th output terminals, and to the secondary first through the secondary N-th output terminals, respectively; (C) a first matrix switching unit having primary first through primary N-th matrix input terminals identified by primary input terminals codes, respectively, and primary first through primary N-th matrix output terminals identified by primary output terminal codes, respectively, and comprising primary first through primary M-th matrix switching circuits arranged in a plurality of primary rows and a plurality of primary columns, the primary first through the primary N-th matrix input terminals being connected to the primary first through the primary N-th output terminals, respectively, the first matrix switching unit being for selectively connecting the primary first through the primary N-th matrix input terminals to the primary first through the primary N-th matrix output terminals, where M represents an integer greater than four, the primary first through the primary M-th matrix switching circuits being formed on primary first through primary Q-th substrates with the primary first through the primary M-th matrix switching circuits grouped into primary first through primary Q-th groups, each of the primary first through the primary Q-th groups comprising at least two of the primary first through the primary M-th matrix switching circuits, the primary first through the primary Q-th groups being in one-to-one correspondence to the primary first through the primary Q-th substrates, where Q represents an integer which is greater than one and is less than N; (D) a second matrix switching unit having secondary first through secondary N-th matrix input terminals identified by secondary input terminal codes, respectively, and secondary first through secondary N-th matrix output terminals identified by secondary output terminal codes, respectively, and comprising secondary first through secondary M-th matrix switching circuits arranged in a plurality of secondary rows and a plurality of secondary columns, the secondary first through the secondary N-th matrix input terminals being connected to the secondary first through the secondary N-th output terminals, respectively, the second matrix switching unit being for selectively connecting the secondary first through the secondary N-th matrix input terminals to the secondary first through the secondary N-th matrix output terminals, the secondary first through the secondary M-th matrix switching circuits being formed on secondary first through secondary Q-th substrates with the secondary first through the secondary M-th matrix switching circuits grouped into secondary first through secondary Q-th groups, each of the secondary first through the secondary Q-th groups comprising at least two of the secondary first through the secondary M-th matrix switching circuits, the secondary first through the secondary Q-th groups being in one-to-one correspondence to the secondary first through the secondary Q-th substrates; (E) a controller comprising a memory and a control unit, the memory being for memorizing connection information signals indicating, in correspondence to the primary and the secondary input terminal codes, designated ones, not greater in number than N, of the primary output terminal codes and of the secondary output terminal codes, the control unit being connected to the memory and the first and the second matrix switching units, for controlling, in accordance with the connection information signals, the first matrix switching unit to make the first matrix switching unit cross connect the primary first through the primary N-th matrix input terminals to ones of the primary first through the primary N-th matrix output terminals that are identified by the designated ones of the primary output terminal codes, the control unit being for controlling the second matrix switching unit to make the second matrix switching unit cross connect the secondary first through the secondary N-th matrix input terminals to ones of the secondary first through the secondary N-th matrix output terminals that are identified by the designated ones of the secondary output terminals codes; (F) primary first through primary M-th switch failure detectors connected to the primary first through the primary M-th matrix switching circuits, respectively, for detecting failures of the primary first through the primary M-th matrix switching circuits to produce primary first through primary M-th switch failure signals, respectively; (G) primary first through primary M-th switch demand data generators connected to the primary first through the primary M-th switch failure detectors, respectively, for generating primary first through primary M-th switch demand data, respectively, when the primary first through the primary M-th switch demand data generators are supplied with the primary first through the primary M-th switch failure signals, respectively; (H) a primary processing unit comprising primary first through primary M-th processing circuits connected to the primary first through the primary M-th switch demand data generators, respectively, arranged equivalently along the primary rows between two adjacent ones of the primary columns and cross-connected to the primary first through the primary M-th matrix switching circuits, the primary first through the primary M-th processing circuits being for processing the first through the N-th input digital signals into primary first through primary N-th processed signals by inserting the primary first through the primary M-th switch demand data into the blank bit fields of the first through the N-th input digital signals, respectively, when the primary first through the primary M-th processing circuits are supplied with the primary first through the primary M-th switch demand data, respectively, the primary first through the primary M-th processing circuits being for processing the first through the N-th input digital signals into the primary first through the primary N-th processed signals by inserting zero data representative of the zero values into the blank bit fields of the first through the N-th input digital signals, respectively, when the primary first through the primary M-th switch demand data generators do not generate the primary first through the primary M-th switch demand data, respectively, the primary processing unit comprising primary group processing circuit connected to the primary first through the primary M-th processing circuits, the primary group processing circuit being for processing, when the primary processing unit is supplied with each of the primary first through the primary M-th switch demand data as a primary particular switch datum, selected ones of the first through the N-th input digital signals as primary particular input digital signals into corresponding ones of the primary first through the primary N-th processed signals by inserting the primary particular switch demand datum into the blank bit fields of the primary particular input digital signals passing through ones of the primary first through the primary N-th matrix switching circuits that are included in one of the groups of the primary first through the primary M-th matrix switching circuits in correspondence to the primary particular switch demand datum; (I) secondary first through secondary M-th switch failure detectors connected to the secondary first through the secondary M-th matrix switching circuits, respectively, for detecting failures of the secondary first through the secondary M-th matrix switching circuits to produce secondary first through secondary M-th switch failure signals, respectively; (J) secondary first through secondary M-th switch demand data generators connected to the secondary first through the secondary M-th switch failure detectors, respectively, for generating secondary first through secondary M-th switch demand data, respectively, when the secondary first through the secondary M-th switch demand data generators are supplied with the secondary first through the secondary M-th switch failure signals, respectively; (K) a secondary processing unit comprising secondary first through secondary M-th processing circuits connected to the secondary first through the secondary M-th switch demand data generators, respectively, and arranged equivalently along the secondary rows between two adjacent ones of the secondary columns and cross-connected to the secondary first through the secondary M-th matrix switching circuits, the secondary first through the secondary M-th processing circuits being for processing the first through the N-th input digital signals into secondary first through secondary N-th processed signals by inserting the secondary first through the secondary M-th switch demand data into the blank bit fields of the first through the N-th input digital signals, respectively, when the secondary first through the secondary M-th processing circuits are supplied with the secondary first through the secondary M-th switch demand data, the secondary first through the secondary M-th processing circuits being for processing the first through the N-th input digital signals into the secondary first through the secondary N-th processed signals by inserting zero data representative of the zero values into the blank bit fields of the first through the N-th input digital signals, respectively, when the secondary first through the secondary M-th switch demand data generators do not generate the secondary first through the secondary M-th switch demand data, respectively, the secondary processing unit comprising a secondary group processing circuit connected to the secondary first through the secondary M-th processing circuits, the secondary group processing circuit being for processing, when the secondary processing unit is supplied with each of the secondary first through the secondary M-th switch demand data as a secondary particular switch demand datum, selected ones of the first through the N-th input digital signals as secondary particular input digital signals into corresponding ones of the secondary first through the secondary N-th processed signals by inserting the secondary particular switch demand datum into the blank bit fields of the secondary particular input digital signals passing through ones of the secondary through the primary M-th matrix switching circuits that are included in one of the groups of the secondary first through the secondary M-th matrix switching circuits in correspondence to the particular switch demand datum; and (L) first through N-th transmit switching circuits comprising primary first through primary N-th transmit input terminals, secondary first through secondary N-th transmit input terminals, first through N-th transmit output terminals, primary first through primary N-th abnormal signal detectors, secondary first through secondary N-th abnormal signal detectors, primary first through primary N-th switch demand data detectors, and secondary first through secondary N-th switch demand data detectors, the primary first through the primary N-th transmit input terminals being connected to the primary first through the primary N-th matrix output terminals, respectively, for receiving the primary first through the primary N-th processed signals through the primary processing unit, respectively, the secondary first through the secondary N-th transmit input terminals being connected to the secondary first through the secondary N-th matrix output terminals, respectively, for receiving the secondary first through the secondary N-th processed signals through the secondary processing unit, respectively, the primary first through the primary N-th abnormal signal detectors being for detecting primary abnormalities of the primary first through the primary N-th processed signals, respectively, the secondary first through the secondary N-th abnormal detectors being for detecting secondary abnormalities of the secondary first through the secondary N-th processed signals, respectively, the primary first through the primary N-th demand data detectors being for detecting the primary first through the primary N-th switch demand data of the primary first through the primary N-th processed signals, respectively, the secondary first through the secondary N-th switch demand data detectors being for detecting the secondary first through the secondary N-th switch demand data of the secondary first through the secondary N-th processed signals, respectively, the first through the N-th transmit switching circuits being for supplying the primary first through the primary N-th processed signals to the first through the N-th transmit terminals, respectively, in at least one of cases where the secondary first through the secondary N-th abnormal signal detectors detect the secondary abnormalities of the secondary first through the secondary N-th processed signals, respectively, and where the secondary first through the secondary N-th switch demand data detectors detect the secondary first through the secondary N-th switch demand data, respectively, the first through the N-th transmit switching circuits being for supplying the secondary first through the secondary N-th processed signals to the first through the N-th transmit output terminals, respectively, in at least one of cases where the primary first through the primary N-th abnormal signal detectors detect the primary abnormalities of the primary first through the primary N-th processed signals, respectively, and where the primary first through the primary N-th switch demand data detectors detect the primary first through the primary N-th switch demand data, respectively.

DESCRIPTION OF THE PREFERRED EMBODIMENT

Figure 1:
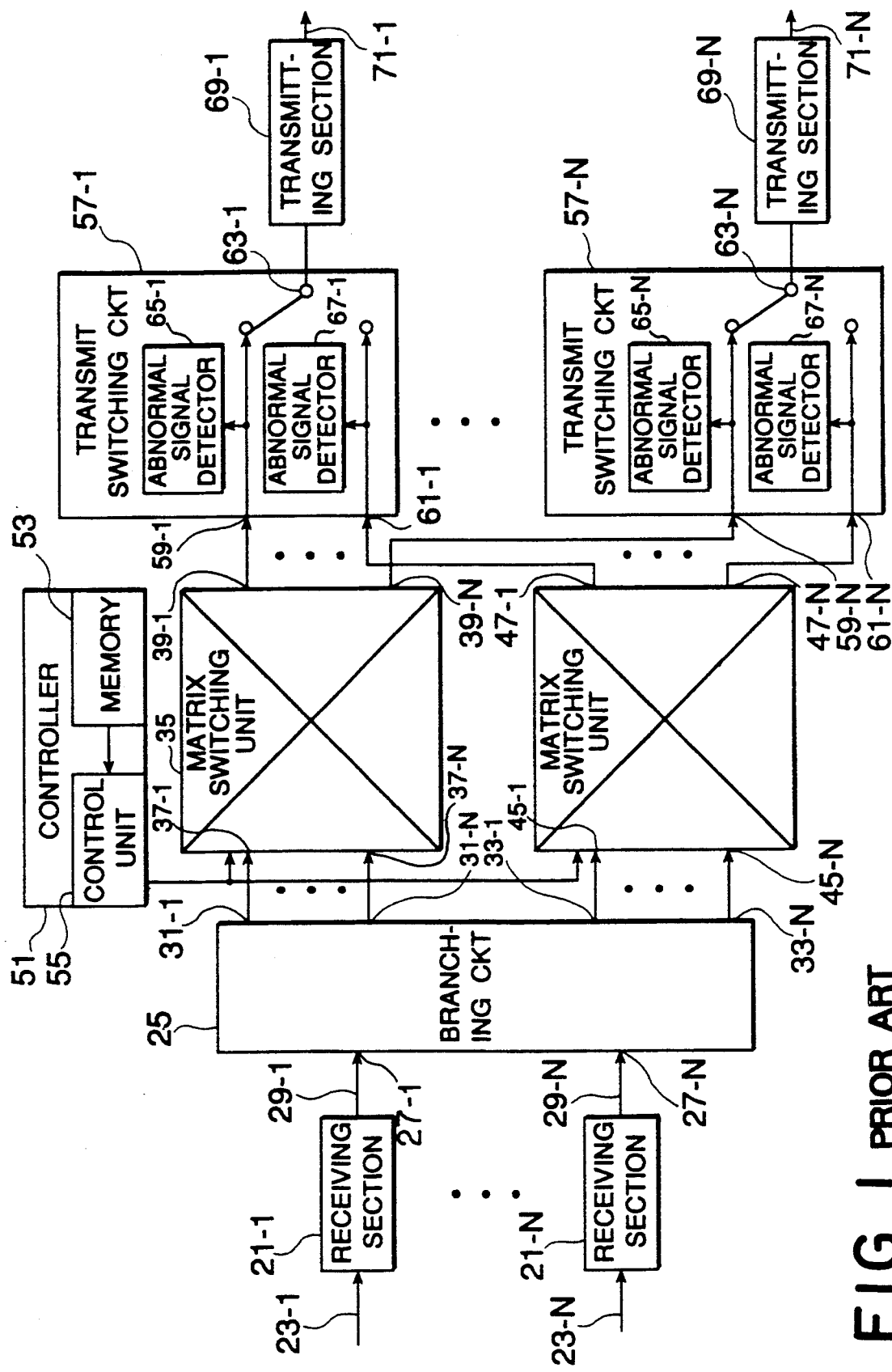
FIG. 1 is a block diagram of a conventional cross-connection network.

Referring to FIG. 1, a conventional cross-connection network will first be described for a better understanding of this invention. The conventional cross-connection network comprises first through N-th receiving sections 21-1 to 21-N which have first through N-th input transmission paths 23-1 to 23-N, respectively, where N represents an integer greater than one. The first through the N-th receiving sections 21-1 to 21-N receive first through N-th input light information signals from the first through the N-th input transmission paths 23-1 to 23-N and convert the first through the N-th input light information signals into first through N-th electric information signals, respectively, will be referred to as first through N-th input digital signals, respectively.

A branching circuit 25 has first through N-th input terminals 27-1 to 27-N which are connected to the first through the N-th receiving sections 21-1 to 21-N through first through N-th input lines 29-1 to 29-N, respectively. The first through the N-th input digital signals are delivered from the first through the N-th receiving sections 21-1 to 21-N to the first through the N-th input terminals 27-1 to 27-N through the first through the N-th input lines 29-1 to 29-N, respectively.

Figure 2:
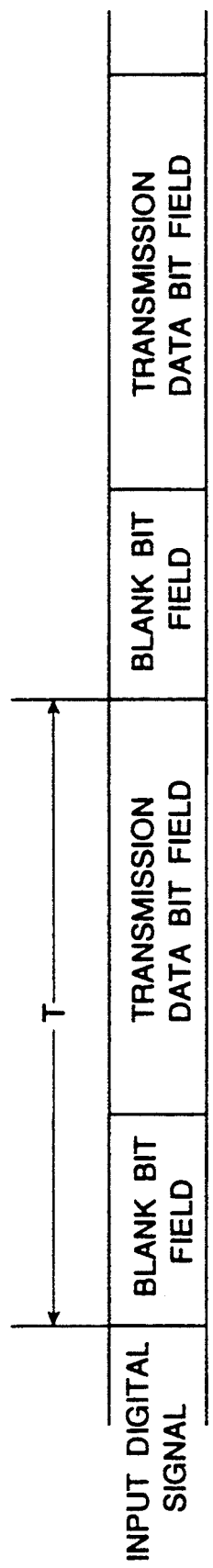
FIG. 2 is a diagram for use in describing an input digital signal used in the conventional cross-connection network illustrated in FIG. 1.

Referring to FIG. 2, each of the first through the N-th input digital signals comprises transmission data bit fields and blank bit fields, wherein the blank bit fields comprising blank bits representative of zero values and periodically appearing at a predetermined period T in each of the first through the N-th input digital signals.

Turning back to FIG. 1, the branching circuit 25 has further primary first through primary N-th output terminals 31-1 to 31-N, and secondary first through secondary N-th output terminals 33-1 to 33-N. The first through the N-th input terminals 27-1 to 27-N are connected to the primary first through the primary N-th output terminals 31-1 to 31-N, and to the secondary first through the secondary N-th output terminals 33-1 to 33-N, respectively.

A first matrix switching unit 35 has primary first through primary N-th matrix input terminals 37-1 to 37-N identified by primary input terminal codes, respectively, and primary first through primary N-th output terminals 39-1 to 39-N identified by primary output terminal codes, respectively. The primary first through the primary N-th matrix input terminals 37-1 to 37-N are connected to the primary first through the primary N-th output terminals 31-1 to 31-N.

Figure 3:
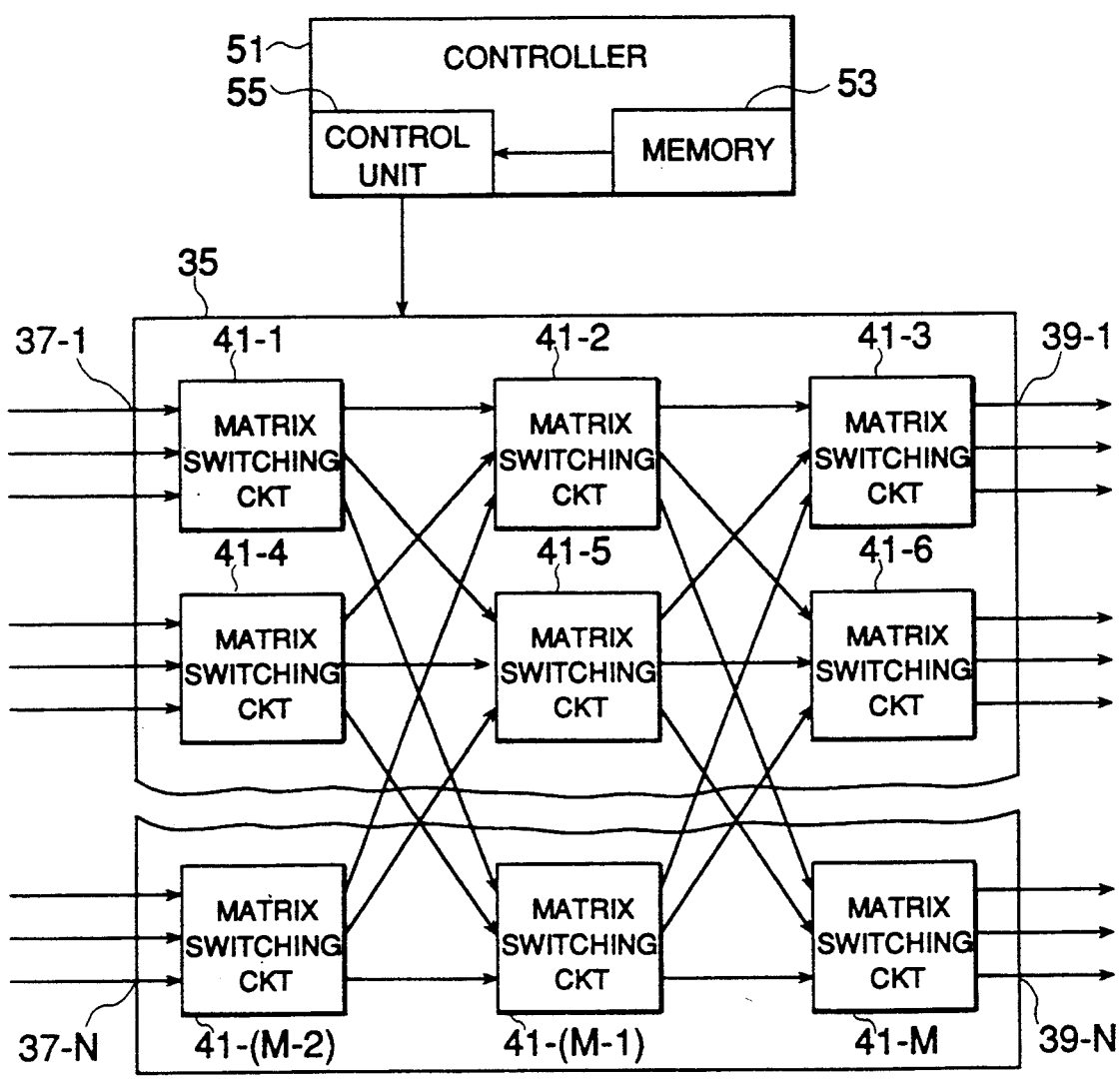
FIG. 3 is a block diagram of a first matrix switching unit of the conventional cross-connection network illustrated in FIG. 1.

Referring to FIG. 3, the first matrix switching circuit 35 comprises primary first through primary M-th matrix switching circuits 41-1 to 41-M arranged in a plurality of rows and a plurality of columns, where M represents an integer greater than four. The primary matrix switching unit 35 selectively connects the primary first through the primary N-th matrix input terminals 37-1 to 37-N to the primary first through the primary N-th matrix output terminals 39-1 to 39-N.

Turning back to FIG. 1, a secondary matrix switching unit 43 has secondary first through secondary N-th matrix input terminals 45-1 to 45-N identified by secondary input terminal codes, respectively, and secondary first through secondary N-th output terminals 47-1 to 47-N identified by secondary output terminal codes, respectively. The secondary first through the secondary N-th matrix input terminals 45-1 to 45-N are connected to the secondary first through the secondary N-th output terminals 33-1 to 33-N.

Figure 4:
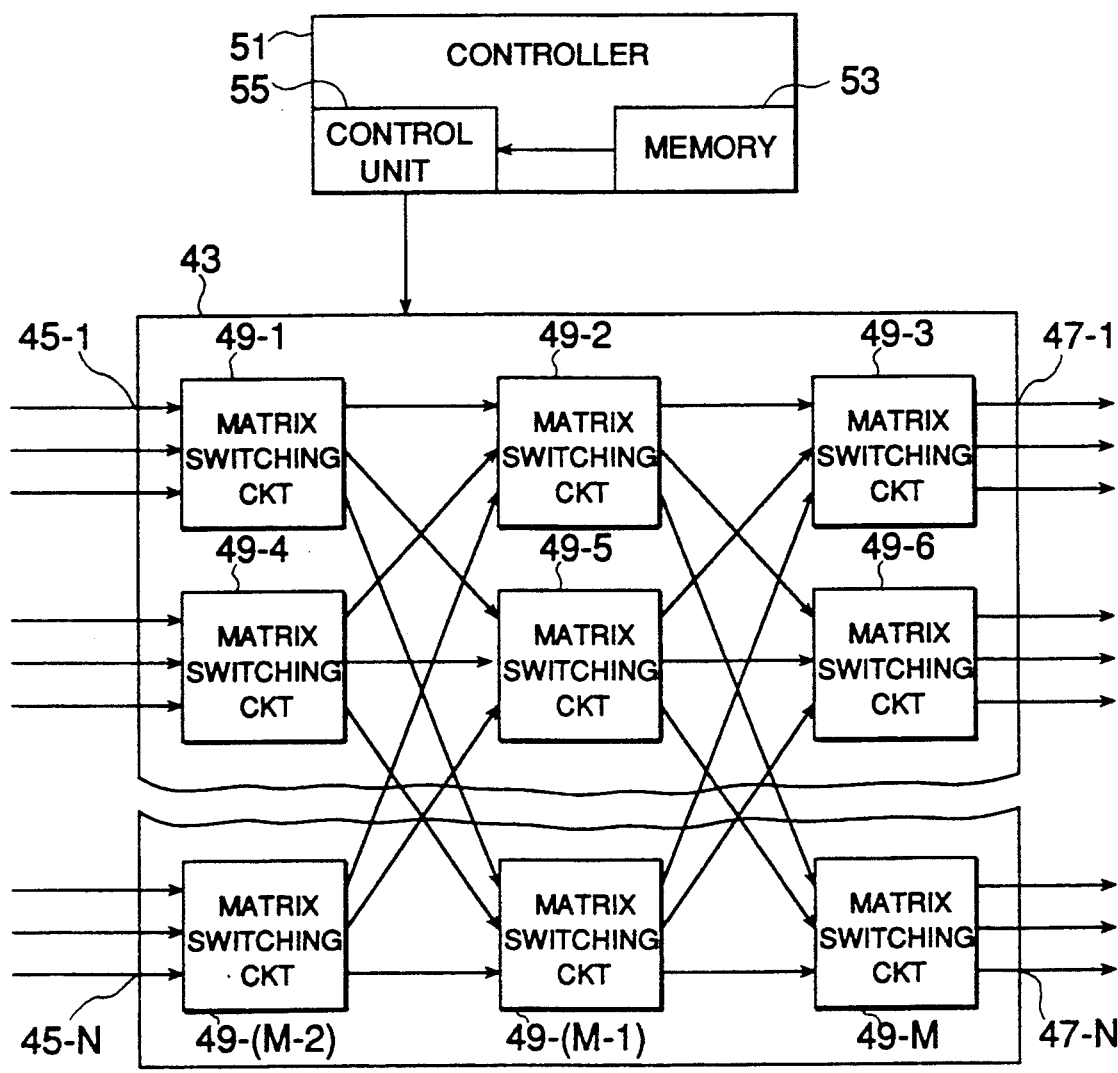
FIG. 4 is a block diagram of a second matrix switching unit of the conventional cross-connection network illustrated in FIG. 1.

Referring to FIG. 4, the second matrix switching circuit 43 comprises primary first through primary M-th matrix switching circuits 49-1 to 49-M arranged in a plurality of rows and a plurality of columns. The primary matrix switching unit 43 selectively connects the primary first through the primary N-th matrix input terminals 45-1 to 45-N to the primary first through the primary N-th matrix output terminals 47-1 to 47-N.

Figure 5:
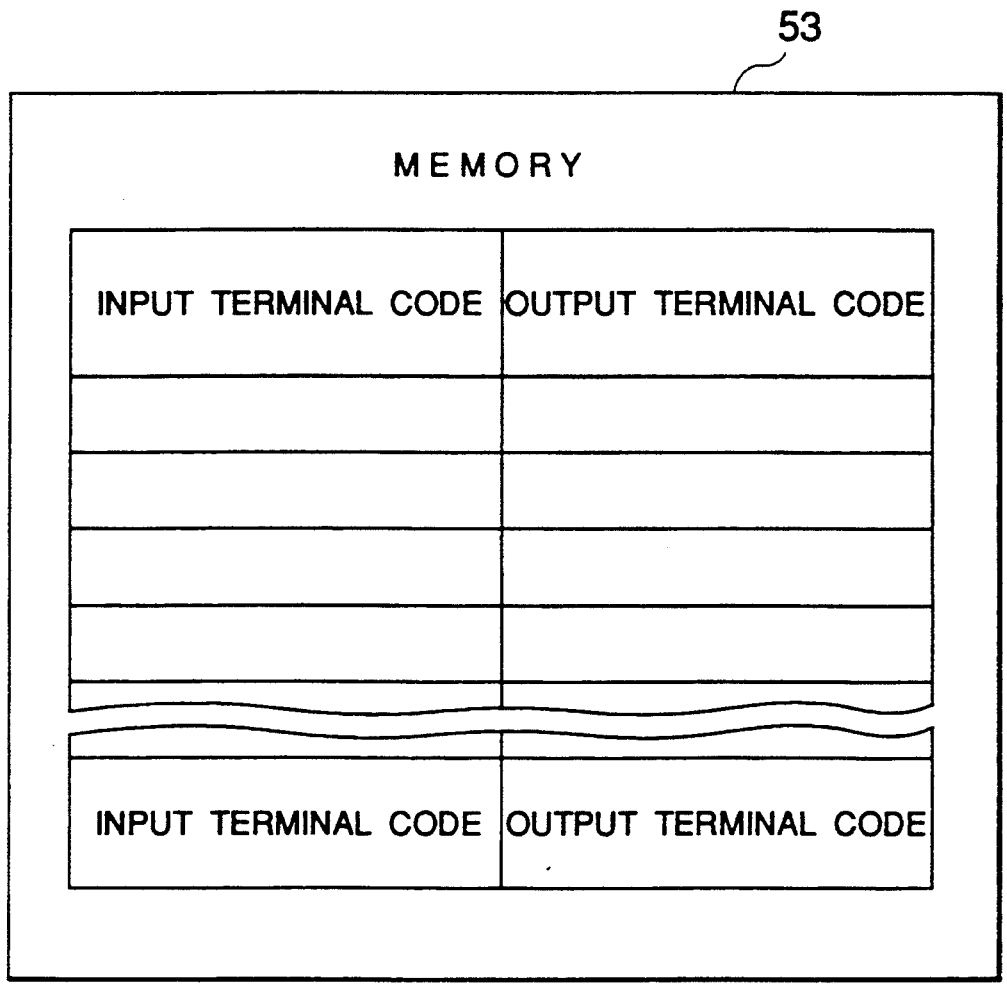
FIG. 5 is a diagram for use in describing operation of a controller of the conventional cross-connection network illustrated in FIG. 1.

Turning back to FIG. 1, a con,roller 51 comprises a memory 53 and a control unit 55. The memory 53 memorizes connection information signals indicating, in correspondence to the primary and the secondary input terminal codes, designated ones, not greater in number than N, of the primary output terminal codes and of the secondary output terminals codes. The connection information signals are shown in FIG. 5.

The control unit 51 is connected to the memory 53 and the first and the second matrix switching units 35 and 43. The control unit 51 controls in accordance with the connection information signals the first matrix switching unit 35 to make the first matrix switching unit 35 cross connect the primary first through the primary N-th matrix input terminals 37-1 to 37-N to ones of the primary first through the primary N-th matrix output terminals 39-1 to 39-N that are identified by the designated ones of the primary output terminals codes. The control unit 51 controls the second matrix switching unit 43 to make the second matrix switching unit 43 cross connect the secondary first through the secondary N-th matrix input terminals 45-1 to 45-N to ones of the secondary first through the secondary N-th matrix output terminals 47-1 to 47-N that are identified by the designated ones of the secondary output terminal codes.

First through N-th transmit switching circuits 57-1 to 57-N comprises primary first through primary N-th transmit input terminals 59-1 to 59-N, secondary first through secondary N-th transmit input terminals 61-1 to 61-N, first through N-th transmit output terminals 63-1 to 63-N, primary first through primary N-th abnormal signal detectors 65-1 to 65-N, and secondary first through secondary N-th abnormal signal detectors 67-1 to 67-N, respectively.

The primary first through the primary N-th transmit input terminals 59-1 to 59-N are connected to the primary first through the primary N-th matrix output terminals 39-1 to 39-N, respectively. The primary first through the primary N-th transmit input terminals 59-1 to 59-N receive the first through the N-th input digital signals through the branching circuit 25 and the first matrix switching unit 35, respectively. The secondary first through the secondary N-th transmit input terminals 61-1 to 61-N are connected to the secondary first through the secondary N-th matrix output terminals 47-1 to 47-N, respectively. The secondary first through the secondary N-th transmit input terminals 61-1 to 61-N receive the first through the N-th input digital signals through the branching circuit 25 and the second matrix switching unit 43, respectively.

The primary first through the primary N-th abnormal signal detectors 65-1 to 65-N detect primary abnormalities of the first through the N-th input digital signals supplied thereto, respectively. The secondary first through the secondary N-th abnormal signal detectors 67-1 to 67-N detect secondary abnormalities of the first through the N-th input digital signals supplied thereto, respectively. All of the first through the N-th transmit switching circuits 57-1 to 57-N supply the first through the N-th input digital signals as first through N-th output transmission signals from the primary first through the primary N-th transmit input terminals 59-1 to 59-N to the first through the N-th transmit output terminals 63-1 to 63-N when one of the secondary first through the secondary N-th abnormal detectors 67-1 to 67-N detects one of the secondary abnormalities of the first through the N-th input digital signals.

All of the first through the N-th transmit switching circuits 57-1 to 57-N supply the secondary first through the secondary N-th input digital signals as the first through the N-th output transmission signals from the secondary first through the secondary N-th transmit input terminals 61-1 to 61-N to the first through the N-th transmit output terminals 63-1 to 63-N when one of the primary first through the primary N-th abnormal signal detectors 65-1 to 65-N detects one of the primary abnormalities of the first through the N-th input digital signals.

It is impossible to use the first matrix switching unit 35 when a failure appears in each of the primary first through the primary M-th matrix switching circuits 41-1 to 41-M. It is impossible to use the second matrix switching unit 43 when a failure appears in each of the secondary first through the secondary M-th matrix switching circuits 49-1 to 49-M. Consequently, the conventional cross-connection network system is impossible to reliably transmit transmission signals.

First through N-th transmitting sections 69-1 to 69-N are connected to the first through the N-th transmit output terminals 63-1 to 63-N, respectively, and also connected to first through N-th output transmission paths 71-1 to 71-N, respectively. The first through the N-th transmitting sections 69-1 to 69-N receive the first through the N-th output transmission signals from the first through the N-th transmit output terminals 63-1 to 63-N and convert the first through the N-th output transmission signals into first through N-th output light information signals which are delivered to the first through the N-th transmission paths 71-1 to 71-N, respectively.

Figure 6:
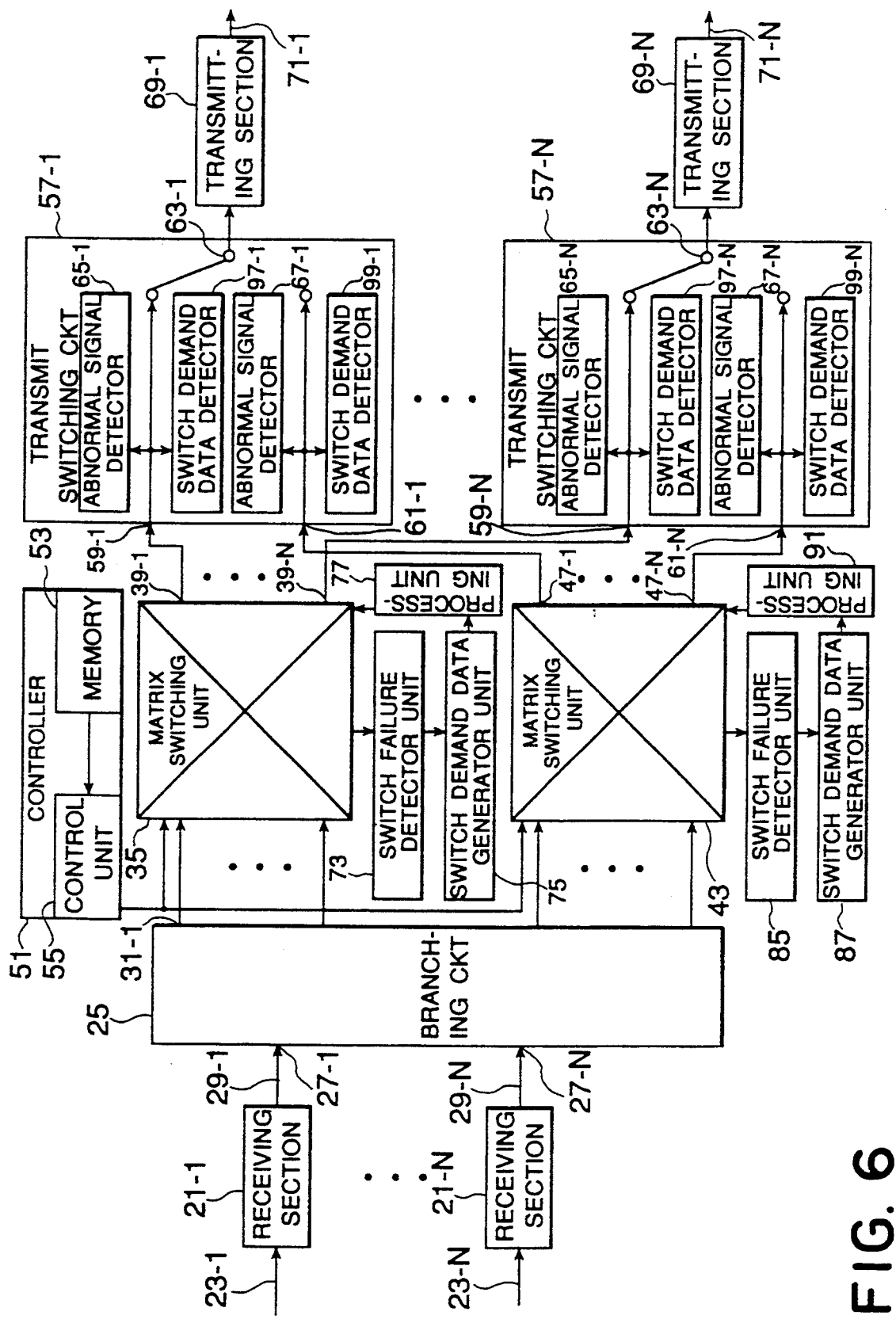
FIG. 6 is a block diagram of a cross-connection network according to a first embodiment of this invention.

Referring to FIG. 6, the description will proceed to a cross-connection network according to a first embodiment of this invention. Similar parts are designated by like reference numerals.

Figure 7:
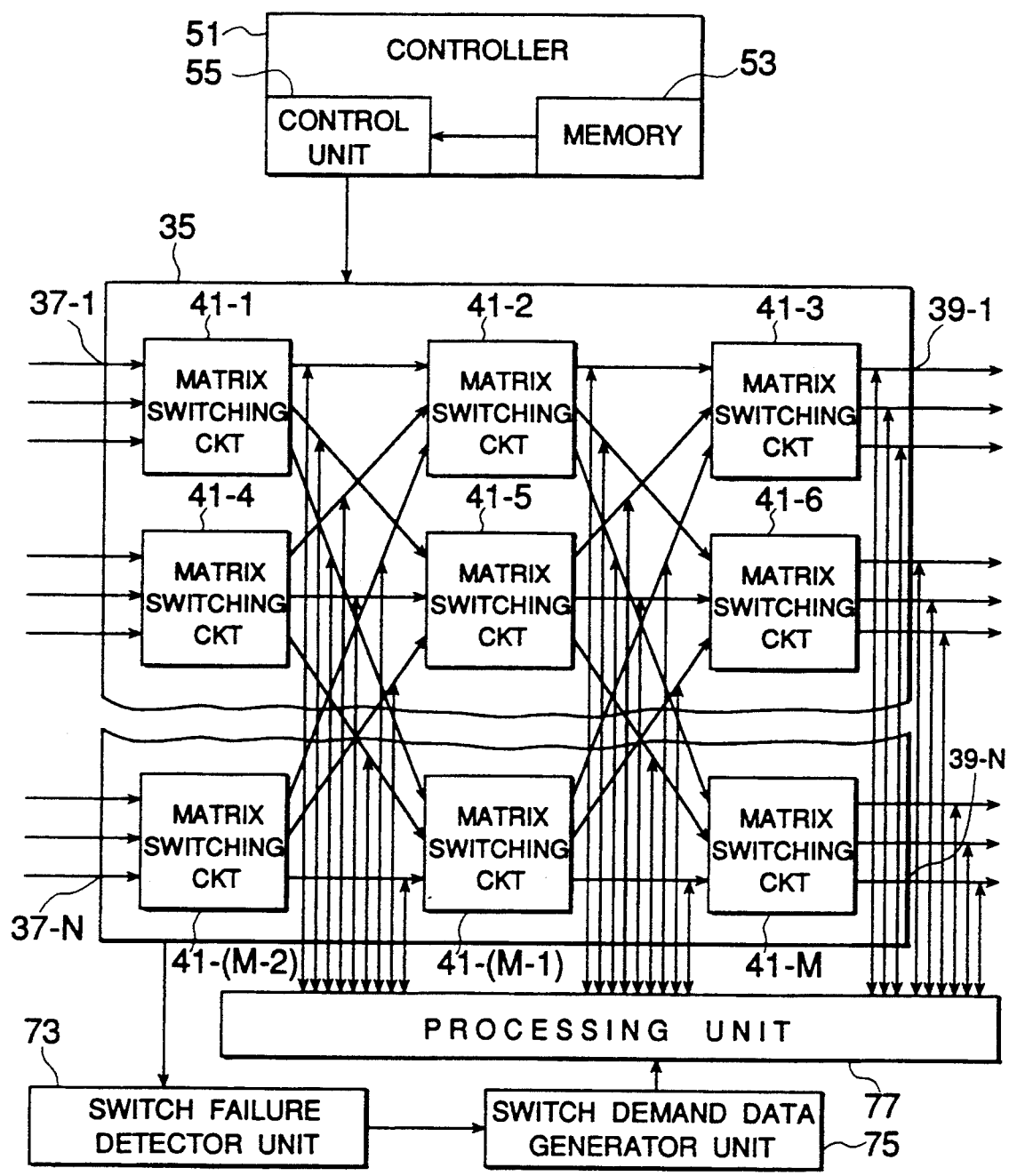
FIG. 7 is a block diagram of a first matrix switching unit of the cross-connection network illustrated in FIG. 6.

In FIGS. 6 and 7, a first switch failure detector unit 73 is connected to the first matrix switching unit 35. A first switch demand data generator unit 75 is connected to the first switch failure detector unit 73. A primary processing unit 77 is between the first matrix switching unit 35 and the first switch demand data generator unit 75.

Figure 8:
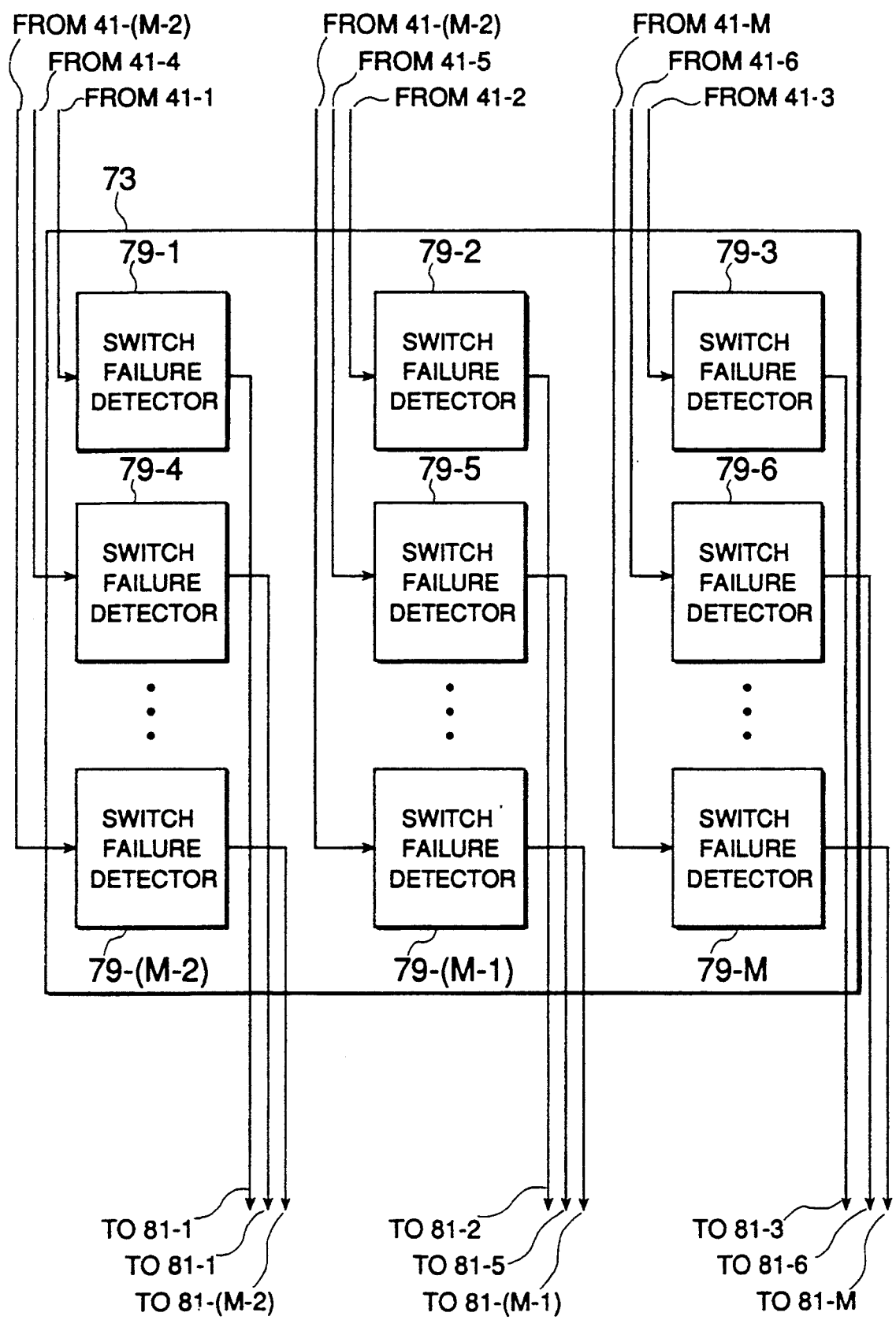
FIG. 8 is a block diagram of a first switch failure detector unit of the cross-connection network illustrated in FIG. 6.

Referring to FIG. 8, the first swatch failure detector unit 73 comprises primary first through primary M-th switch failure detectors 79-1 to 79-N connected to the primary first through the primary M-th matrix switching circuits 41-1 to 41-M (FIG. 7), respectively. The primary first through the primary M-th switch failure detectors 79-1 to 79-M detect failures of the primary first through the primary M-th matrix switching circuits 41-1 to 41-M to produce primary first through primary M-th switch failure signals, respectively.

Figure 9:
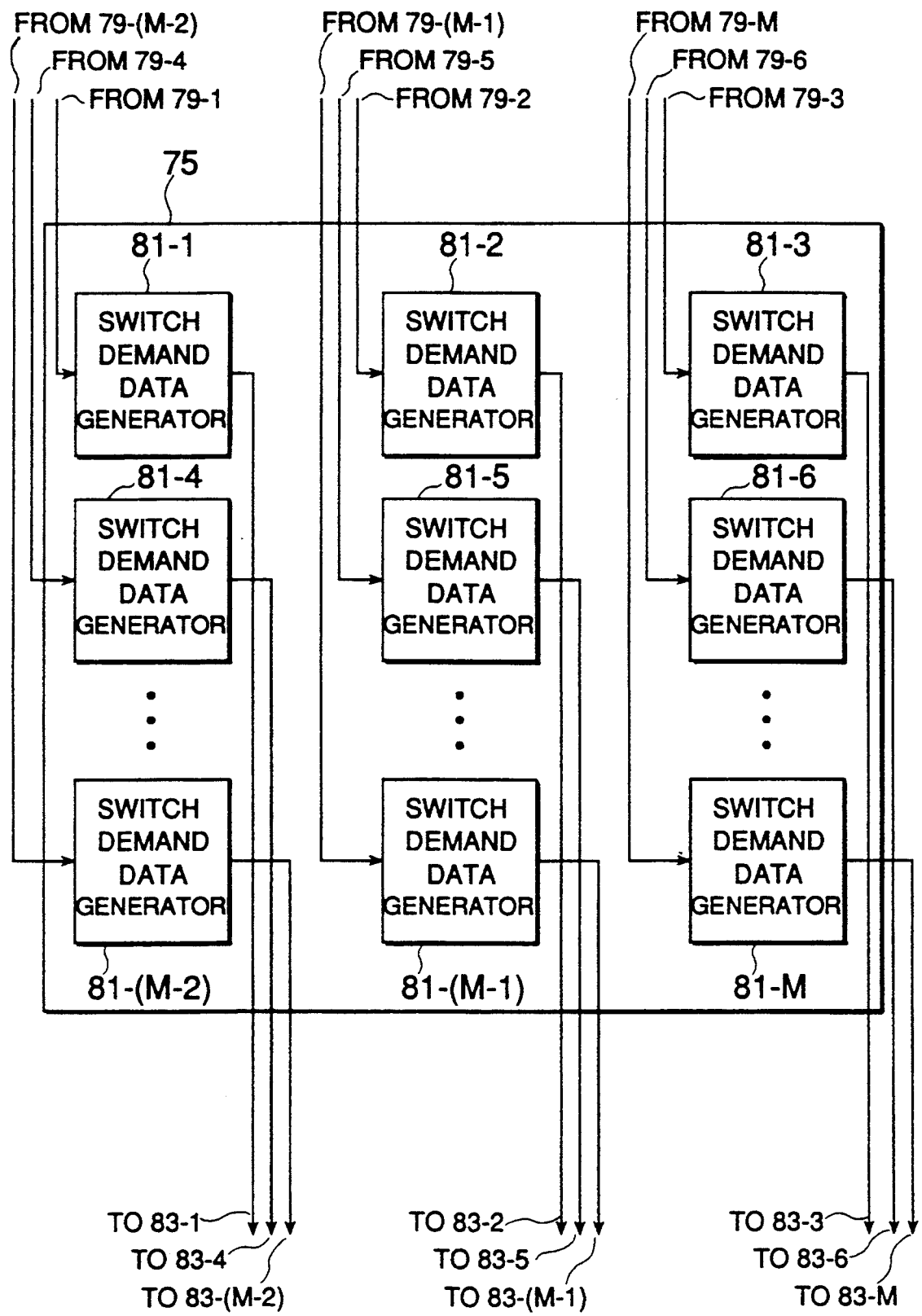
FIG. 9 is a block diagram of a first switch demand data generator unit of the cross-connection network illustrated in FIG. 6.

Referring to FIG. 9, the first switch demand data generator unit 75 comprises primary first through primary M-th switch demand data generators 81-1 to 81-M connected to the primary first through the primary M-th switch failure detectors 79-1 to 79-M (FIG. 8), respectively. The primary first through the primary M-th demand data generators 81-1 to 81-M generate primary first through primary M-th switch demand data, respectively, when the primary first through the primary M-th switch demand data generators 81-1 to 81-M are supplied with the primary first through the primary M-th switch failure signals, respectively.

Figure 10:
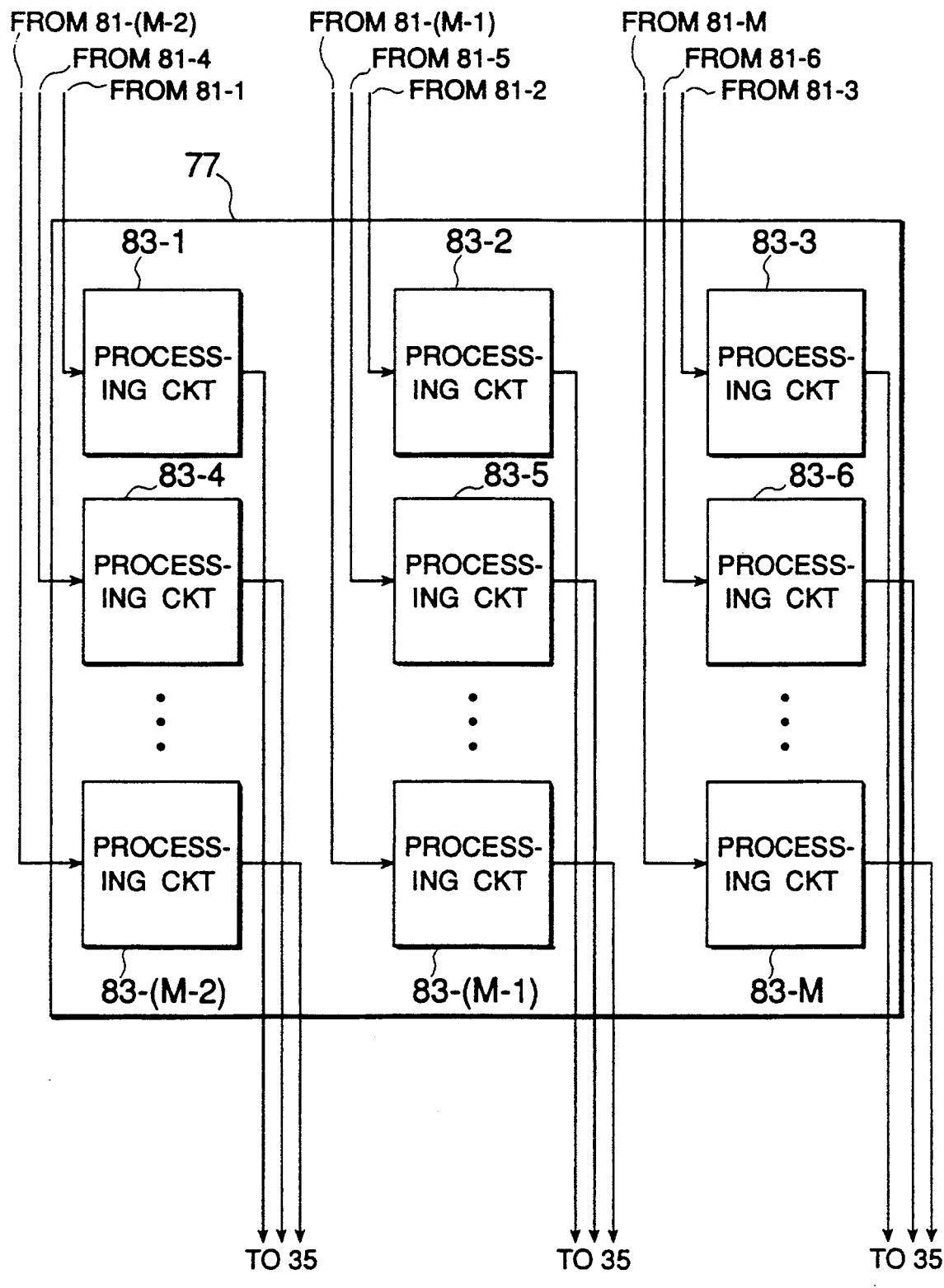
FIG. 10 is a block diagram of a first processing unit of the cross-connection network illustrated in FIG. 6.

Referring to FIG. 10, the primary processing unit 77 comprises primary first through primary M-th processing circuits 83-1 to 83-M connected to the primary first through the primary M-th switch demand data generators 81-1 to 81-M (FIG. 9), respectively. The primary first through the primary M-th processing circuits 83-1 to 83-M are arranged equivalently along the primary rows between two adjacent ones of the primary first columns and cross-connected to the primary first through the primary M-th matrix switching circuits 41-1 to 41-M (FIG. 7). The primary first through the primary M-th processing circuits 81-1 to 81-M process the first through the N-th input digital signals from the primary first through the primary M-th matrix switching circuits 41-1 to 41-M into primary first through primary N-th processed signals by inserting the primary first through the primary M-th switch demand data into the blank bit fields of the first through the N-th input digital signals, respectively, when the primary first through the primary M-th processing circuits 83-1 to 83-M are supplied with the primary first through the primary M-th switch demand data. The primary first through the primary M-th processing circuits 83-1 to 83-M process the first through the N-th input digital signals into the primary first through the primary N-th processed signals by inserting zero data representative of the zero values into the blank bit fields of the first through the N-th input digital signals, respectively, when the primary first through the primary M-th switch demand data generators 81-1 to 81-M (FIG. 9) do not generate the primary first through the primary M-th switch demand data, respectively.

Figure 11:
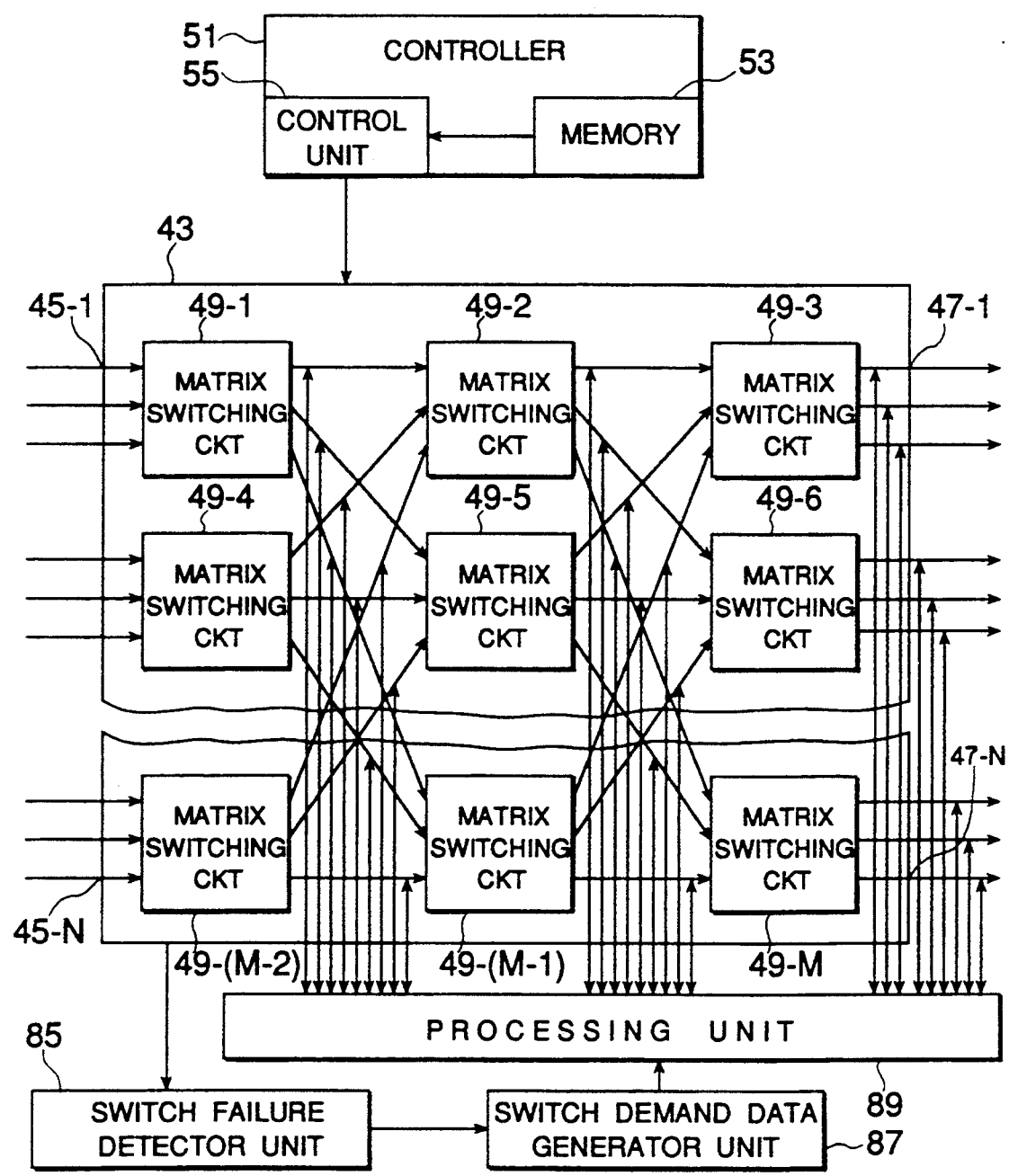
FIG. 11 is a block diagram of a second matrix switching unit of the cross-connection network illustrated in FIG. 6.

Referring to FIGS. 6 and 11, a second switch failure detector unit 85 is connected to the second matrix switching unit 43. A second switch demand data generator unit 87 is connected to the second switch failure detector unit 85. A secondary processing unit 89 is between the second matrix switching unit 43 and the second switch demand data generator unit 87.

Figure 12:
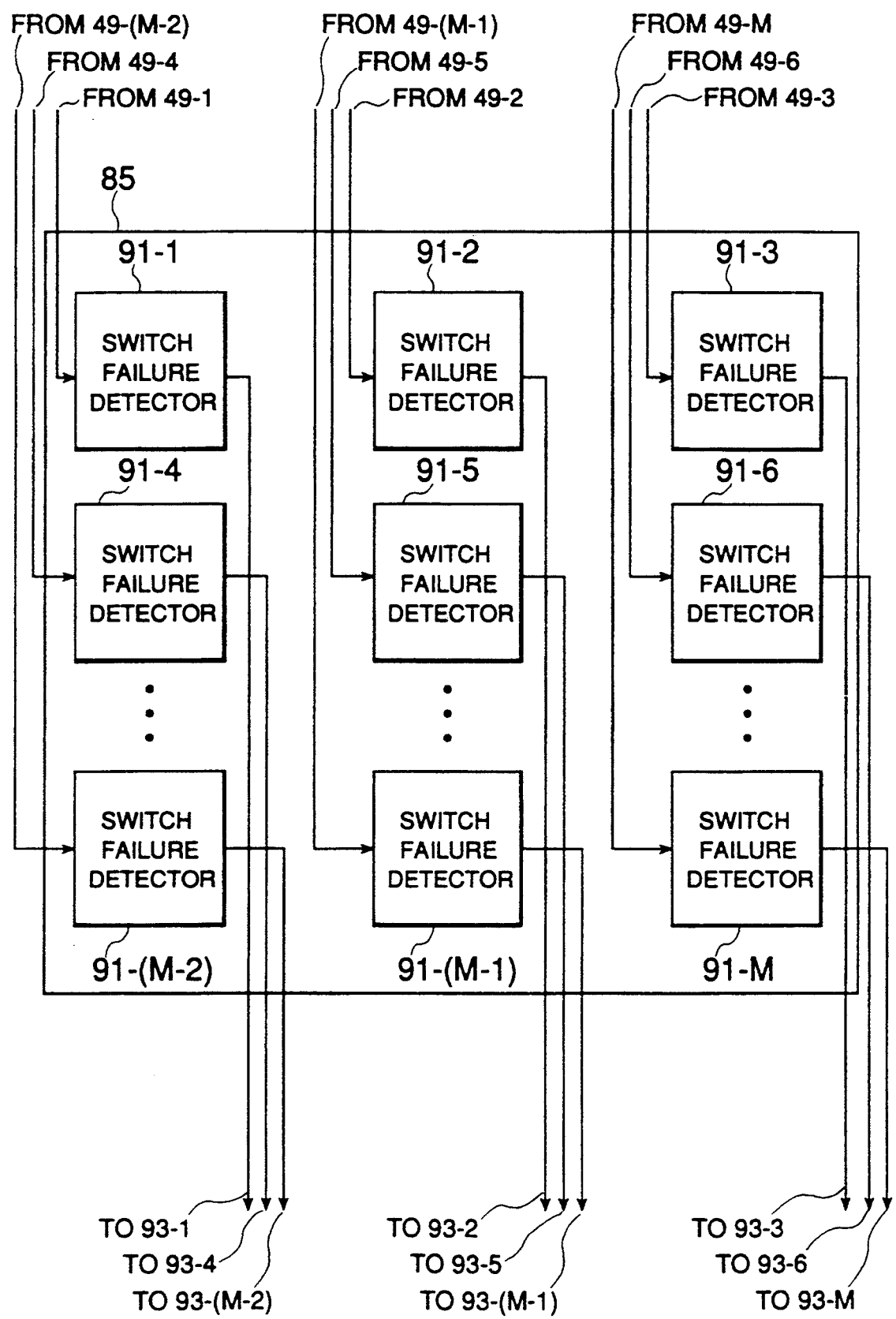
FIG. 12 is a block diagram of a second switch failure detector unit of the cross-connection network illustrated in FIG. 6.

Referring to FIG. 12, the second switch failure detector unit 85 comprises secondary first through secondary M-th switch failure detectors 91-1 to 91-N connected to the secondary first through the secondary M-th matrix switching circuits 49-1 to 49-M (FIG. 11), respectively. The secondary first through the secondary M-th switch failure detectors 91-1 to 91-M detect failures of the secondary first through the secondary M-th matrix switch circuits 49-1 to 49-M to produce secondary first through secondary M-th switch failure signals, respectively.

Figure 13:
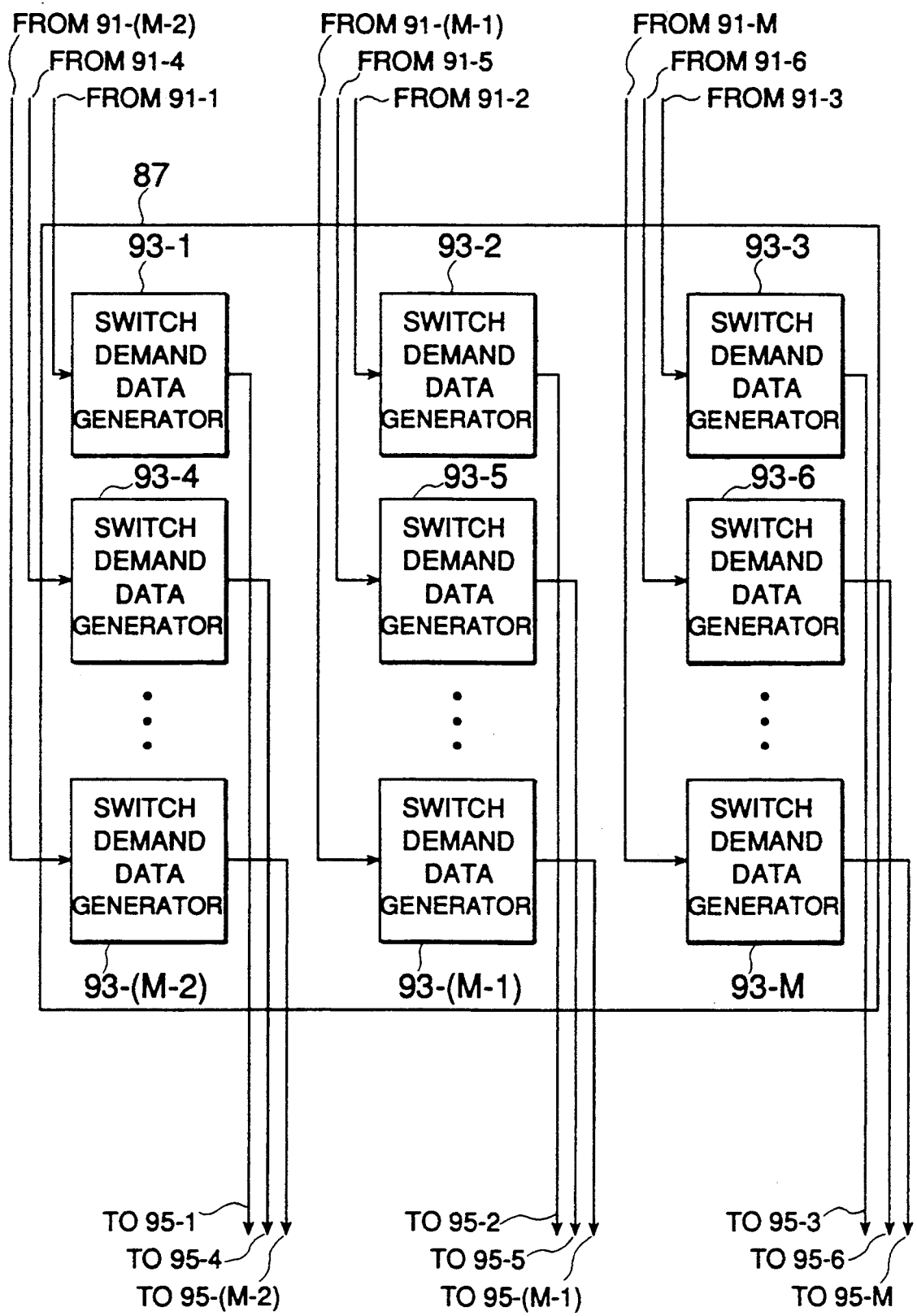
FIG. 13 is a block diagram of a second switch demand data generator unit of the cross-connection network illustrated in FIG. 6.

Referring to FIG. 13, the second switch demand data generator unit 87 comprises secondary first through secondary M-th switch demand data generators 93-1 to 93-M connected to the secondary first through the secondary M-th switch failure detectors 91-1 to 91-M (FIG. 12), respectively. The secondary first through the secondary M-th demand data generators 93-1 to 93-M generate secondary first through secondary M-th switch demand data, respectively, when the secondary first through the secondary M-th switch demand data generators 93-1 to 93-M are supplied with the secondary first through the secondary M-th switch failure signals, respectively.

Figure 14:
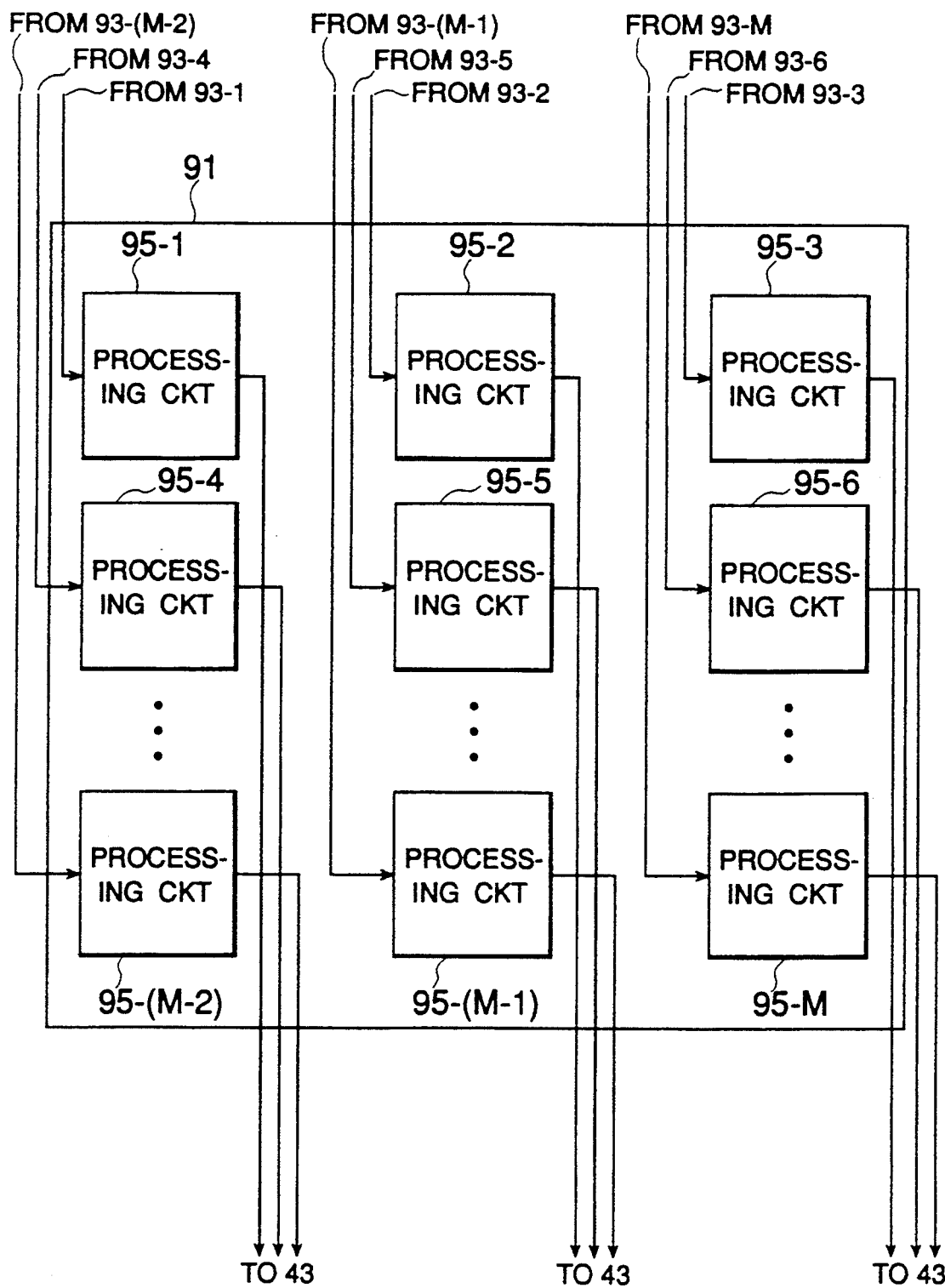
FIG. 14 is a block diagram of a second processing unit of the cross-connection network illustrated in FIG. 6.

Referring to FIG. 14, the secondary processing unit comprises secondary first through secondary M-th processing circuits 95-1 to 95-M connected to the secondary first through the secondary M-th switch demand data generators 93-1 to 93-M (FIG. 13), respectively. The secondary first through the secondary M-th processing circuits 95-1 to 95-M are arranged equivalently along the secondary rows between two adjacent ones of the secondary first columns and cross-connected to the secondary first through the secondary M-th matrix switching circuits 49-1 to 49-M (FIG. 11). The secondary first through the secondary M-th processing circuits 95-1 to 95-M process the first through the N-th input digital signals from the secondary first through the secondary M-th matrix switching circuits 49-1 to 49-M into secondary first through secondary N-th processed signals by inserting the secondary first through the secondary M-th switch demand data into the blank bit fields of the first through the N-th input digital signals, respectively, when the secondary first through the secondary M-th processing circuits 95-1 to 95-M are supplied with the secondary first through the secondary M-th switch demand data. The secondary first through the secondary M-th processing circuits 95-1 to 95-M process the first through the N-th input digital signals into secondary first through the secondary N-th processed signals by inserting zero data representative of the zero values into the blank bit fields of the first through the N-th input digital signals, respectively, when the secondary first through the secondary M-th switch demand data generators 93-1 to 93-M (FIG. 13) do not generate the second first through the second M-th switch demand data, respectively.

Turning back to FIG. 6, the first through the N-th transmit switching circuits 57-1 to 57-N further comprises primary first through primary N-th switch demand data detectors 97-1 to 97-N, and secondary first through secondary N-th switch demand data detectors 99-1 to 99-N. The primary first through the primary N-th transmit input terminals 59-1 to 59-N are connected to the primary first through the primary N-th matrix output terminals, respectively, for receiving the primary first through the primary N-th processed signals through the primary processing unit 77, respectively. The secondary first through the secondary N-th transmit input terminals 61-1 to 61-N are connected to the secondary first through the secondary N-th matrix output terminals 47-1 to 47-N, respectively, for receiving the secondary first through the secondary N-th processed signals through the secondary processing unit 91, respectively.

The primary first through the primary N-th abnormal signal detectors 65-1 to 65-N detect primary abnormalities of the primary first through the primary N-th processed signals, respectively. The secondary first through the secondary N-th abnormal detectors 67-1 to 67-N detect secondary abnormalities of the secondary first through the secondary N-th processed signals, respectively.

The primary first through the primary N-th switch demand data detectors 97-1 to 97-N detect the primary first through the primary N-th switch demand data of the primary first through the primary N-th processed signals, respectively. The secondary first through the secondary N-th switch demand data detectors 99-1 to 99-N detect the secondary first through the secondary N-th switch demand data of the secondary first through the secondary N-th processed signals, respectively.

The first through the N-th transmit switching circuits 57-1 to 57-N supply the primary first through the primary N-th processed signals as the first through the N-th output transmission signal to the first through the N-th transmit output terminals 63-1 to 63-N, respectively, in at least one of cases where the secondary first through the secondary N-th abnormal signal detectors 67-1 to 67-N detect the secondary abnormalities of the secondary first through the secondary N-th processed signals, respectively, and where the secondary first through the secondary N-th switch demand data detectors 99-1 to 99-N detect the secondary first through the secondary N-th switch demand data, respectively.

The first through the N-th transmit switching circuits 57-1 to 57-N supply the secondary first through the secondary N-th processed signals as the first through the N-th output transmission signals to the first through the N-th transmit output terminals 63-1 to 63-N, respectively, in at least one of cases where the primary first through the primary N-th abnormal signal detectors detect the primary abnormalities of the primary first through the primary N-th processed signals, respectively, and where the primary first through the primary N-th switch demand data detectors detect the primary first through the primary N-th switch demand data, respectively.

Referring to FIGS. 15 to 18, the description will proceed to a cross-connection network according to a second embodiment of this invention. Similar parts are designated by like reference numerals.

Figure 15:
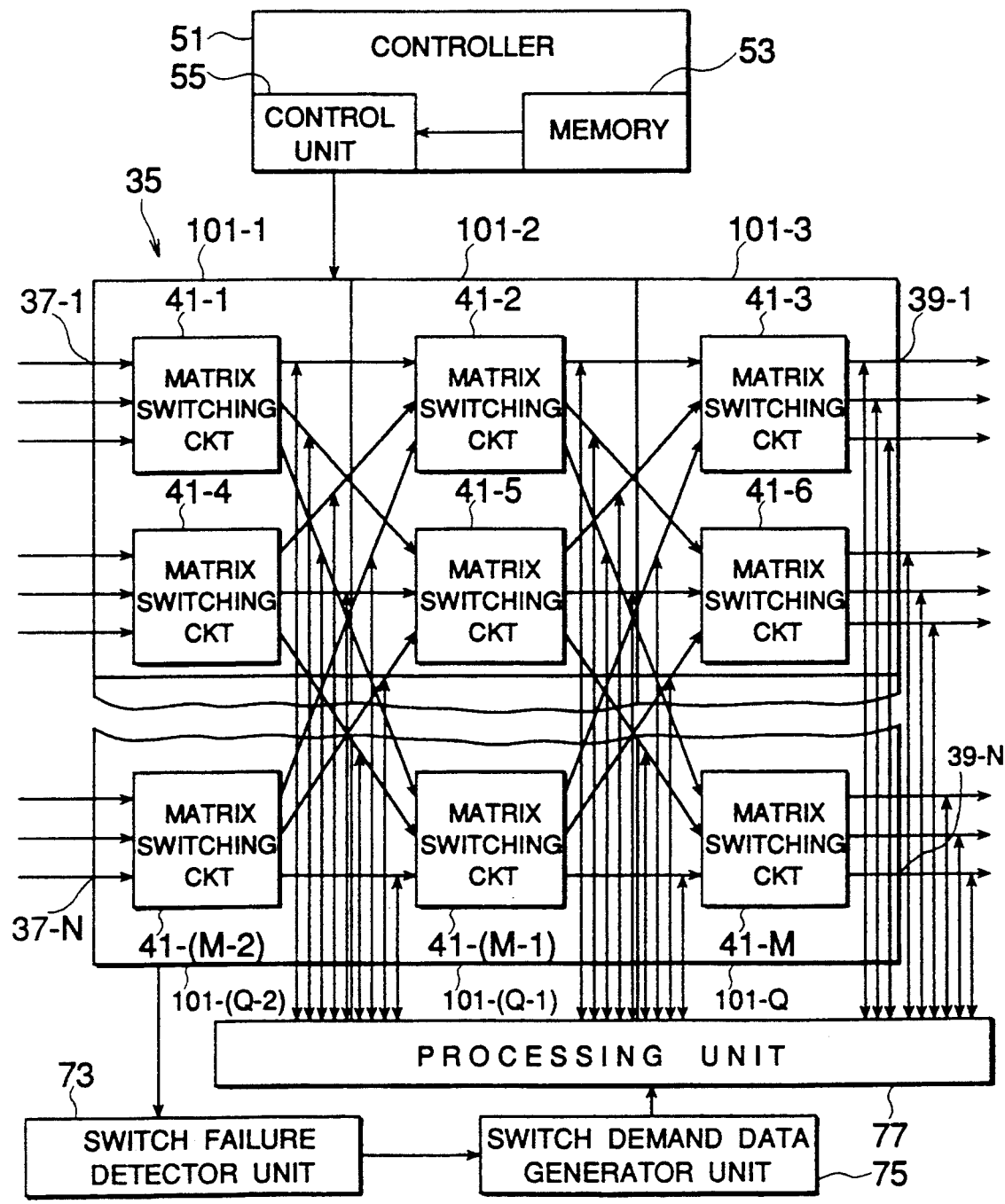
FIG. 15 is a block diagram of a first matrix switching unit of a cross-connection network according to a second embodiment of this invention.

In FIG. 15, the primary first through the primary M-th matrix switching circuits 41-1 to 41-M are formed on primary first through primary Q-th substrates 101-1 to 101-Q with the primary first through the primary M-th matrix switching circuits 41-1 to 41-M grouped into primary first through primary Q-th groups, where Q represents an integer which is greater than one and is less than N. Each of the primary first through the primary Q-th groups comprises at least two of the primary first through the primary M-th matrix switching circuits 41-1 to 41-M. The primary first through the primary Q-th groups are in one-to-one correspondence to the primary first through the primary Q-th substrates 102-1 to 102-Q.

Figure 16:
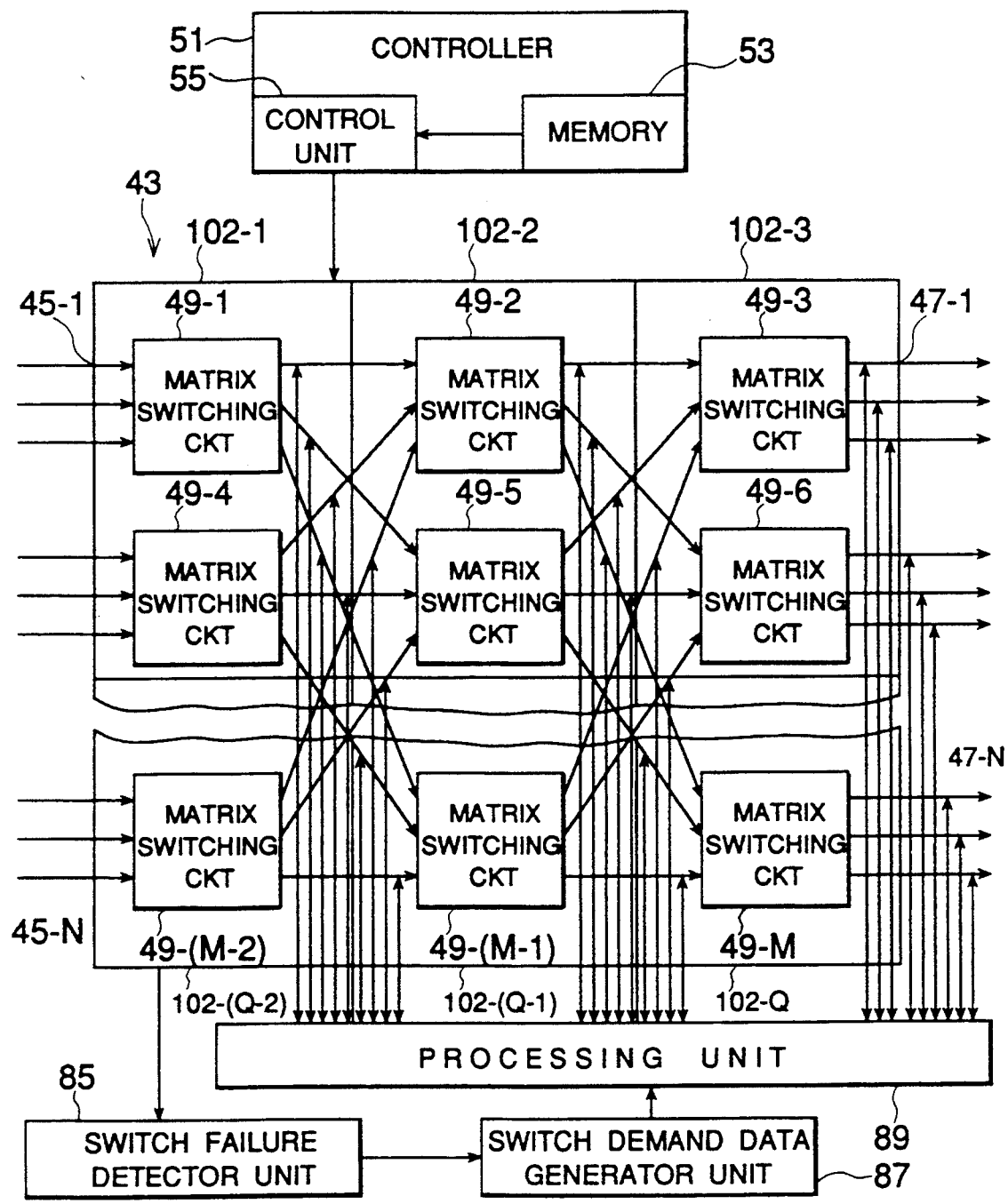
FIG. 16 is a block diagram of a second matrix switching unit of the cross-connection network according to the second embodiment of this invention.

Referring to FIG. 16, the secondary first through the secondary M-th matrix switching circuits 49-1 to 49-M are formed on secondary first through secondary Q-th substrates 102-1 to 102-Q with the secondary first through the secondary M-th matrix switching circuits 49-1 to 49-M grouped into secondary first through secondary Q-th groups. Each of the secondary first through the secondary Q-th groups comprises at least two of the secondary first through the secondary M-th matrix switching circuits 49-1 to 49-M. The secondary first through the secondary Q-th groups are in one-to-one correspondence to the secondary first through the secondary Q-th substrates 102-1 to 102-Q.

Figure 17:
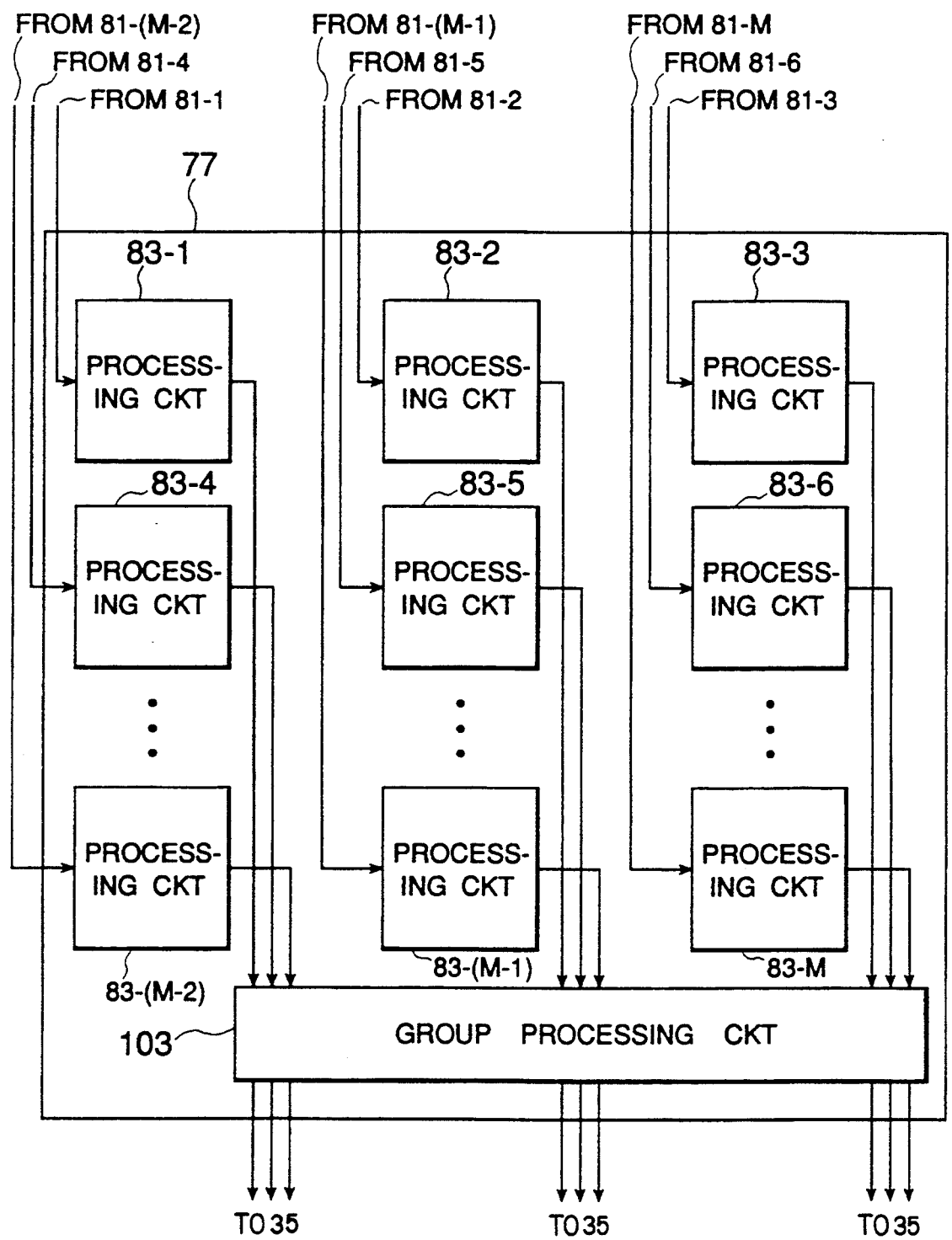
FIG. 17 is a block diagram of a first processing unit of the cross-connection network according to the second embodiment of this invention.

Referring to FIG. 17, the primary processing unit 77 further comprises a primary group processing circuit 103 connected between the primary first through the primary M-th processing circuits 83-1 to 83-M and the first matrix switching unit 35. The primary group processing circuit 103 processes, when the primary processing unit 77 is supplied with each of the primary first through the primary M-th switch demand data as a primary particular switch datum, selected ones of the first through the N-th input digital signals as primary particular input digital signals into corresponding ones of the primary first through the primary N-th processed signals by inserting the primary particular switch demand datum into the blank bit fields of the primary particular input digital signals passing through ones of the primary first through the primary N-th matrix switching circuits 41-1 to 41-M (FIG. 15) that are included in one of the groups of the primary first through the primary M-th matrix switching circuits 41-1 to 41-M in correspondence to the primary particular switch demand datum.

Figure 18:
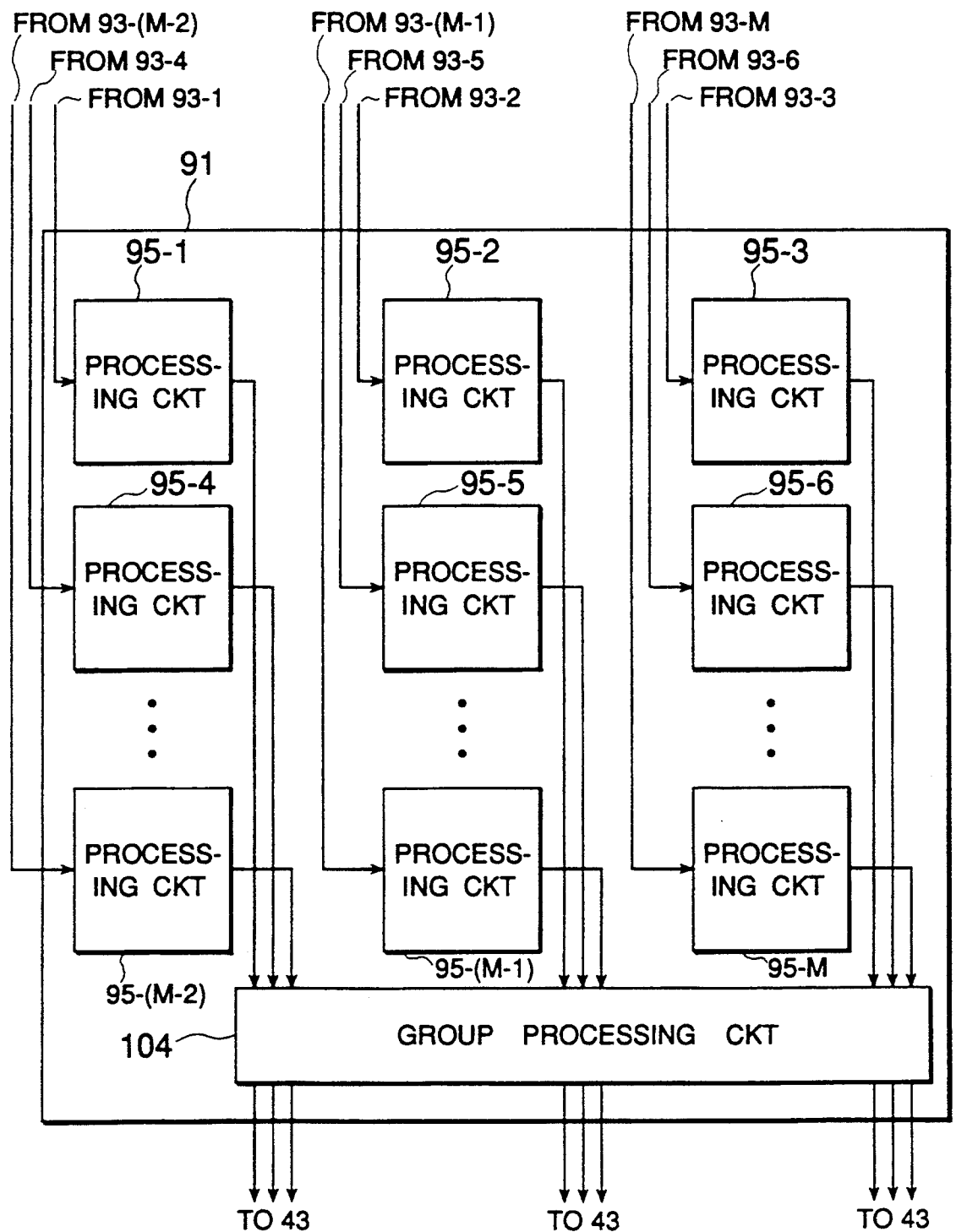
FIG. 18 is a block diagram of a second processing unit of the cross-connection network according to the second embodiment of this invention.

Referring to FIG. 18, the secondary processing unit 91 further comprises a secondary group processing circuit 104 connected between the secondary first through the secondary M-th processing circuits 95-1 to 95-M and the second matrix switching unit 43. The secondary group processing circuit 104 processes, when the secondary processing unit 91 is supplied with each of the secondary first through the secondary M-th switch demand data as a secondary particular switch demand datum, selected ones of the first through the N-th input digital signals as secondary particular input digital signals into corresponding ones of the secondary first through the secondary N-th processed signals by inserting the secondary particular switch demand datum into the blank bit fields of the secondary particular input digital signals passing through ones of the secondary through the primary M-th matrix switching circuits 49-1 to 49-M (FIG. 16) that are included in one of the groups of the secondary first through the secondary M-th matrix switching circuits 49-1 to 49-M in correspondence to the particular switch demand datum.

While this invention has thus far been described in conjunction with two embodiments thereof, it will readily be possible for those skilled in the art to put this invention into practice in various other manners. For example, the first and the second switch failure detector units 73 and 85, the first and the second switch demand data generator units 75 and 87, the primary and the secondary processing units 77 and 91, the primary first through the primary N-th switch demand data detectors 97-1 to 97-N, and the secondary first through the secondary N-th switch demand data detectors 99-1 to 99-N may be not used in the cross-connection network described in connection with FIGS. 6 to 14.

What is claimed is:

1. A cross-connection network comprising:

first through N-th input lines for receiving first through N-th input digital signals, respectively, where N represents an integer greater than one;

a branching circuit having first through N-th input terminals, primary first through primary N-th output terminals, and secondary first through secondary N-th output terminals, said first through said N-th input terminals being connected to said first through said N-th input lines, to said primary first through said primary N-th output terminals, and to said secondary first through said secondary N-th output terminals, respectively;

a first matrix switching unit having primary first through primary N-th matrix input terminals identified by primary input terminal codes, respectively, and primary first through primary N-th matrix output terminals identified by primary output terminal codes, respectively, said primary first through said primary N-th matrix input terminals being connected to said primary first through said primary N-th output terminals, respectively, said first matrix switching unit being for selectively connecting said primary first through said primary N-th matrix input terminals to said primary first through said primary N-th matrix output terminals;

a second matrix switching unit having secondary first through secondary N-th matrix input terminals identified by secondary input terminal codes, respectively, and secondary first through secondary N-th matrix output terminals identified by secondary output terminal codes, respectively, said secondary first through said secondary N-th matrix input terminals being connected to said secondary first through said secondary N-th output terminals, respectively, said second matrix switching unit being for selectively connecting said secondary first through said secondary N-th matrix input terminals to said secondary first through said secondary N-th matrix output terminals;

a controller comprising a memory and a control unit, said memory being for memorizing connection information signals indicating, in correspondence to said primary and said secondary input terminal codes, designated ones, not greater in number than N, of said primary output terminal codes and of said secondary output terminal codes, said control unit being connected to said memory and said first and said second matrix switching units for controlling, in accordance with said connection information signals, said first matrix switching unit to make said first matrix switching unit cross connect said primary first through said primary N-th matrix input terminals to ones of said primary first through said primary N-th matrix output terminals that are identified by said designated ones of the primary output terminal codes, said control unit being for controlling said second matrix switching unit to make said second matrix switching unit cross connect said secondary first through said secondary N-th matrix input terminals to ones of said secondary first through said secondary N-th matrix output terminals that are identified by said designated ones of said secondary output terminal codes; and first through N-th transmit switching circuits comprising primary first through primary N-th transmit input terminals, secondary first through secondary N-th transmit input terminals, first through N-th transmit output terminals, primary first through primary N-th abnormal signal detectors, and secondary first through secondary N-th abnormal signal detectors, respectively, said primary first through said primary N-th transmit input terminals being connected to said primary first through said primary N-th matrix output terminals, respectively, for receiving said first through said N-th input digital signals through said branching circuit and said first matrix switching unit, respectively, said secondary first through said secondary N-th transmit input terminals being connected to said secondary first through said secondary N-th matrix output terminals, respectively, for receiving said first through said N-th input digital signals through said branching circuit and said second matrix switching unit, respectively, said primary first through said primary N-th abnormal signal detectors being for detecting primary abnormalities of said first through said N-th input digital signals supplied thereto, respectively, said secondary first through said secondary N-th abnormal signal detectors being for detecting secondary abnormalities of said first through said N-th input digital signals supplied thereto, respectively, said first through said N-th transmit switching circuits being for supplying said first through said N-th input digital signals from said primary first through said primary N-th transmit input terminals to said first through said N-th transmit output terminals, respectively, when said secondary first through said secondary N-th abnormal detectors detect the secondary abnormalities of said first through said N-th input digital signals, respectively, said first through said N-th transmit switching circuits being for supplying said secondary first through said secondary N-th input digital signals from said secondary first through said secondary N-th transmit input terminals to said first through said N-th transmit output signals, respectively, when said primary first through said primary N-th abnormal signal detectors detect the primary abnormalities of said first through said N-th input digital signals, respectively.

2. A cross-connection network comprising:

first through N-th input lines for receiving first through N-th input digital signals, respectively, where N represents an integer greater than one, each of said first through said N-th input digital signals comprising transmission data bit fields and blank bit fields, wherein said blank bit fields comprise blank bits representative of zero values and periodically appearing in each of said first through said N-th input digital signals;

a branching circuit having first through N-th input terminals, primary first through primary N-th output terminals, and secondary first through secondary N-th output terminals, said first through said N-th input terminals being connected to said first through said N-th input lines, to said primary first through said primary N-th output terminals, and to said secondary first through said secondary N-th output terminals, respectively;

a first matrix switching unit having primary first through primary N-th matrix input terminals identified by primary input terminal codes, respectively, and primary first through primary N-th matrix output terminals identified by primary output terminal codes, respectively, and comprising primary first through primary M-th matrix switching circuits arranged in a plurality of rows and a plurality of columns, said primary first through said primary N-th matrix input terminals being connected to said primary first through said primary N-th output terminals, respectively, said first matrix switching unit being for selectively connecting said primary first through said primary N-th matrix input terminals to said primary first through said primary N-th matrix output terminals, where M represents an integer greater than four;

a second matrix switching unit having secondary first through secondary N-th matrix input terminals identified by secondary input terminal codes, respectively, and secondary first through secondary N-th matrix output terminals identified by secondary output terminal codes, respectively, and comprising secondary first through secondary M-th matrix switching circuits arranged in a plurality of rows and a plurality of columns, said secondary first through said secondary N-th matrix input terminals being connected to said secondary first through said secondary N-th output terminals, respectively, said second matrix switching unit being for selectively connecting said secondary first through said secondary N-th matrix input terminals to said secondary first through said secondary N-th matrix output terminals;

a controller comprising a memory and a control unit, said memory being for memorizing connection information signals indicating, in correspondence to said primary and said secondary input terminal codes, designated ones, not greater in number than N, of said primary output terminal codes and of said secondary output terminal codes, said control unit being connected to said memory and said first and said second matrix switching units for controlling, in accordance with said connection information signals, said first matrix switching unit to make said first matrix switching unit cross connect said primary first through said primary N-th matrix input terminals to ones of said primary first through said primary N-th matrix output terminals that are identified by said designated ones of the primary output terminal codes, said control unit being for controlling said second matrix switching unit to make said second matrix switching unit cross connect said secondary first through said secondary N-th matrix input terminals to ones of said secondary first through said secondary N-th matrix output terminals that are identified by said designated ones of said secondary output terminal codes;

primary first through primary M-th switch failure detectors connected to said primary first through said primary M-th matrix switching circuits, respectively, for detecting failures of said primary first through said primary M-th matrix switching circuits to produce primary first through primary M-th switch failure signals, respectively;

primary first through primary M-th switch demand data generators connected to said primary first through said primary M-th switch failure detectors, respectively, for generating primary first through primary M-th switch demand data, respectively, when said primary first through said primary M-th switch demand data generators are supplied with said primary first through said primary M-th switch failure signals, respectively;

a primary processing unit comprising primary first through primary M-th processing circuits connected to said primary first through said primary M-th switch demand data generators, respectively, arranged equivalently along said primary rows between two adjacent ones of said primary first columns and cross-connected to said primary first through said primary M-th matrix switching circuits, said primary first through said primary M-th processing circuits being for processing said first through said N-th input digital signals into primary first through primary N-th processed signals by inserting said primary first through said primary M-th switch demand data into the blank bit fields of said first through said N-th input digital signals, respectively, when said primary first through said primary M-th processing circuits are supplied with said primary first through said primary M-th switch demand data, said primary first through said primary M-th processing circuits being for processing said first through said N-th input digital signals into said primary first through said primary N-th processed signals by inserting zero data representative of said zero values into the blank bit fields of said first through said N-th input digital signals, respectively, when said primary first through said primary M-th switch demand data generators do not generate said primary first through said primary M-th switch demand data, respectively;

secondary first through secondary M-th switch failure detectors connected to said secondary first through said secondary M-th matrix switching circuits, respectively, for detecting failures of said secondary first through said secondary M-th matrix switching circuits to produce secondary first through secondary M-th switch failure signals, respectively;

secondary first through secondary M-th switch demand data generators connected to said secondary first through said secondary M-th switch failure detectors, respectively, for generating secondary first through secondary M-th switch demand data, respectively, when said secondary first through said secondary M-th switch demand data generators are supplied with said secondary first through said secondary M-th switch failure signals, respectively;

a secondary processing unit comprising secondary first through secondary M-th processing circuits connected to said secondary first through said secondary M-th switch demand data generators, respectively, arranged equivalently along said primary rows between two adjacent ones of said primary first columns and cross-connected to said primary first through said primary M-th matrix switching circuits, said secondary first through said secondary M-th processing circuits being for processing said first through said N-th input digital signals into secondary first through secondary N-th processed signals by inserting said secondary first through said secondary M-th switch demand data into the blank bit fields of said first through said N-th input digital signals, respectively, when said secondary first through said secondary M-th processing circuits are supplied with said secondary first through said primary M-th switch demand data, said secondary first through said secondary M-th processing circuits being for processing said first through said N-th input digital signals into said secondary first through said secondary N-th processed signals by inserting zero data representative of said zero values into the blank bit fields of said first through said N-th input digital signals, respectively, when said secondary first through said secondary M-th switch demand data generators do not generate said secondary first through said secondary M-th switch demand data, respectively; and first through N-th transmit switching circuits comprising primary first through primary N-th transmit input terminals, secondary first through secondary N-th transmit input terminals, first through N-th transmit output terminals, primary first through primary N-th abnormal signal detectors, secondary first through secondary N-th abnormal signal detectors, primary first through primary N-th switch demand data detectors, and secondary first through secondary N-th switch demand data detectors, said primary first through said primary N-th transmit input terminals being connected to said primary first through said primary N-th matrix output terminals, respectively, for receiving said primary first through said primary N-th processed signals through said primary processing unit, respectively, said secondary first through said secondary N-th transmit input terminals being connected to said secondary first through said secondary N-th matrix output terminals, respectively, for receiving said secondary first through said secondary N-th processed signals through said secondary processing unit, respectively, said primary first through said primary N-th abnormal signal detectors being for detecting primary abnormalities of said primary first through said primary N-th processed signals, respectively, said secondary first through said secondary N-th abnormal detectors being for detecting secondary abnormalities of said secondary first through said secondary N-th processed signals, respectively, said primary first through said primary N-th demand data detectors being for detecting the primary first through the primary N-th switch demand data of said primary first through said primary N-th processed signals, respectively, said secondary first through said secondary N-th switch demand data detectors being for detecting the secondary first through the secondary N-th switch demand data of said secondary first through said secondary N-th processed signals, respectively, said first through said N-th transmit switching circuits being for supplying said primary first through said primary N-th processed signals to said primary first through said primary N-th transmit output terminals, respectively, in at least one of cases where said secondary first through said secondary N-th abnormal signal detectors detect the secondary abnormalities of said secondary first through said secondary N-th processed signals, respectively, and where said secondary first through said secondary N-th switch demand data detectors detect said secondary first through said secondary N-th switch demand data, respectively, said first through said N-th transmit switching circuits being for supplying said secondary first through said secondary N-th processed signals to said secondary first through said secondary N-th transmit output terminals, respectively, in at least one of cases where said primary first through said primary N-th abnormal signal detectors detect the primary abnormalities of said primary first through said primary N-th processed signals, respectively, and where said primary first through said primary N-th switch demand data detectors detect said primary first through said primary N-th switch demand data, respectively.

3. A cross-connection network comprising: first through N-th input lines for receiving first through N-th input digital signals, respectively, where N represents an integer greater than one, each of said first through said N-th input digital signals comprising transmission data bit fields and blank bit fields, wherein said blank bit fields comprise blank bits representative of zero values and periodically appearing in each of said first through said N-th input digital signals;

a branching circuit having first through N-th input terminals, primary first through primary N-th output terminals, and secondary first through secondary N-th output terminals, said first through said N-th input terminals being connected to said first through said N-th input lines, to said primary first through said primary N-th output terminals, and to said secondary first through said secondary N-th output terminals, respectively;

a first matrix switching unit having primary first through primary N-th matrix input terminals identified by primary input terminal codes, respectively, and primary first through primary N-th matrix output terminals identified by primary output terminal codes, respectively, and comprising primary first through primary M-th matrix switching circuits arranged in a plurality of primary rows and a plurality of primary columns, said primary first through said primary N-th matrix input terminals being connected to said primary first through said primary N-th output terminals, respectively, said first matrix switching unit being for selectively connecting said primary first through said primary N-th matrix input terminals to said primary first through said primary N-th matrix output terminals, where M represents an integer greater than four, said primary first through said primary M-th matrix switching circuits being formed on primary first through primary Q-th substrates with said primary first through said primary M-th matrix switching circuits grouped into primary first through primary Q-th groups, each of said primary first through said primary Q-th groups comprising at least two of said primary first through said primary M-th matrix switching circuits, said primary first through said primary Q-th groups being in one-to-one correspondence to said primary first through said primary Q-th substrates, where Q represents an integer which is greater than one and is less than N;

a second matrix switching unit having secondary first through secondary N-th matrix input terminals identified by secondary input terminal codes, respectively, and secondary first through secondary N-th matrix output terminals identified by secondary output terminal codes, respectively, and comprising secondary first through secondary M-th matrix switching circuits arranged in a plurality of secondary rows and a plurality of secondary columns, said secondary first through said secondary N-th matrix input terminals being connected to said secondary first through said secondary N-th output terminals, respectively, said second matrix switching unit being for selectively connecting said secondary first through said secondary N-th matrix input terminals to said secondary first through said secondary N-th matrix output terminals, said secondary first through said secondary M-th matrix switching circuits being formed on secondary first through secondary Q-th substrates with said secondary first through said secondary M-th matrix switching circuits grouped into secondary first through secondary Q-th groups, each of said secondary first through said secondary Q-th groups comprising at least two of said secondary first through said secondary M-th matrix switching circuits, said secondary first through said secondary Q-th groups being in one-to-one correspondence to said secondary first through secondary Q-th substrates;

a controller comprising a memory and a control unit, said memory being for memorizing connection information signals indicating, in correspondence to said primary and said secondary input terminal codes, designated ones, not greater in number than N, of said primary output terminal codes and of said secondary output terminal codes, said control unit being connected to said memory and said first and said second matrix switching units, for controlling, in accordance with said connection information signals, said first matrix switching unit to make said first matrix switching unit cross connect said primary first through said primary N-th matrix input terminals to ones of said primary first through said primary N-th matrix output terminals that are identified by said designated ones of the primary output terminal codes, said control unit being for controlling said second matrix switching unit to make said second matrix switching unit cross connect said secondary first through said secondary N-th matrix input terminals to ones of said secondary first through said secondary N-th matrix output terminals that are identified by said designated ones of said secondary output terminal codes;

primary first through primary M-th switch failure detectors connected to said primary first through said primary M-th matrix switching circuits, respectively, for detecting failures of said primary first through said primary M-th matrix switching circuits to produce primary first through primary M-th switch failure signals, respectively;

primary first through primary M-th switch demand data generators connected to said primary first through said primary M-th switch failure detectors, respectively, for generating primary first through primary M-th switch demand data, respectively, when said primary first through said primary M-th switch demand data generators are supplied with said primary first through said primary M-th switch failure signals, respectively;

a primary processing unit comprising primary first through primary M-th processing circuits connected to said primary first through said primary M-th switch demand data generators, respectively, arranged equivalently along said primary rows between two adjacent ones of said primary columns and cross-connected to said primary first through said primary M-th matrix switching circuits, said primary first through said primary M-th processing circuits being for processing said first through said N-th input digital signals into primary first through primary N-th processed signals by inserting said primary first through said primary M-th switch demand data into the blank bit fields of said first through said N-th input digital signals, respectively, when said primary first through said primary M-th processing circuits are supplied with said primary first through said primary M-th switch demand data, respectively, said primary first through said primary M-th processing circuits being for processing said first through said N-th input digital signals into said primary first through said primary N-th processed signals by inserting zero data representative of said zero values into the blank bit fields of said first through said N-th input digital signals, respectively, when said primary first through said primary M-th switch demand data generators do not generate said primary first through said primary M-th switch demand data, respectively, said primary processing unit comprising primary group processing circuit connected to said primary first through said M-th primary processing circuits, said primary group processing circuit being for processing, when said primary processing unit is supplied with each of said primary first through said primary M-th switch demand data as a primary particular switch demand datum, selected ones of said first through said N-th input digital signals as primary particular input digital signals into corresponding ones of said primary first through said primary N-th processed signals by inserting said primary particular switch demand datum into the blank bit fields of said primary particular input digital signals passing through ones of said primary first through said primary N-th matrix switching circuits that are included in one of the groups of said primary first through said primary M-th matrix switching circuits in correspondence to said primary particular switch demand datum;

secondary first through secondary M-th switch failure detectors connected to said secondary first through said secondary M-th matrix switching circuits, respectively, for detecting failures of said secondary first through said secondary M-th matrix switching circuits to produce secondary first through secondary M-th switch failure signals, respectively;

secondary first through secondary M-th switch demand data generators connected to said secondary first through said secondary M-th switch failure detectors, respectively for generating secondary first through secondary M-th switch demand data, respectively, when said secondary first through said secondary M-th switch demand data generators are supplied with said secondary first through said secondary M-th switch failure signals, respectively;

a secondary processing unit comprising secondary first through secondary M-th processing circuits connected to said secondary first through said secondary M-th switch demand data generators, respectively, and arranged equivalently along said secondary rows between two adjacent ones of said secondary columns and cross-connected to said secondary first through said secondary M-th matrix switching circuits, said secondary first through said secondary M-th processing circuits being for processing said first through said N-th input digital signals into secondary first through secondary N-th processed signals by inserting said secondary first through said secondary M-th switch demand data into the blank bit fields of said first through said N-th input digital signals, respectively, when said secondary first through said secondary M-th processing circuits are supplied with said secondary first through said secondary M-th switch demand data, said secondary first through said secondary M-th processing circuits being for processing said first through said N-th input digital signals into said secondary first through said secondary N-th processed signals by inserting zero data representative of said zero values into the blank bit fields of said first through said N-th input digital signals, respectively, when said secondary first through said secondary M-th switch demand data generators do not generate said secondary first through said secondary M-th switch demand data, respectively, said secondary processing unit comprising a secondary group processing circuit connected to said secondary first through said secondary M-th processing circuits, said secondary group processing circuit being for processing, when said secondary processing unit is supplied with each of said secondary first through said secondary M-th switch demand data as a secondary particular switch demand datum, selected ones of said first through said N-th input digital signals as secondary particular input digital signals into corresponding ones of said secondary first through said secondary N-th processed signals by inserting said secondary particular switch demand datum into the blank bit fields of said secondary particular input digital signals passing through ones of said secondary through said primary M-th matrix switching circuits that are included in one of the groups of said secondary first through said secondary M th matrix switching circuits in correspondence to said secondary particular switch demand datum; and first through N-th transmit switching circuits comprising primary first through primary N-th transmit input terminals, secondary first through secondary N-th transmit output terminals, primary first through primary N-th abnormal signal detectors, secondary first through secondary N-th abnormal signal detectors, primary first through primary N-th switch demand data detectors, and secondary first through secondary N-th switch demand data detectors, said primary first through said primary N-th abnormal signal detectors being for detecting primary abnormalities of said primary first through said primary N-th processed signals, respectively, said secondary first through said secondary N-th abnormal detectors being for detecting secondary abnormalities of said secondary first through said secondary N-th processed signals, respectively, said primary first through said primary N-th demand data detectors being for detecting the primary first through the primary N-th switch demand data of said primary first through said primary N-th processed signals, respectively, said secondary first through said secondary N-th switch demand data detectors being for detecting the secondary first through the secondary N-th switch demand data of said secondary first through said secondary N-th processed signals, respectively, said first through said N-th transmit switching circuits being for supplying said primary first through said primary N-th processed signals to said first through said N-th transmit terminals, respectively, in at least one of cases where said secondary first through said secondary N-th abnormal signal detectors detect the secondary abnormalities of said secondary first through said secondary N-th processed signals, respectively, and where said secondary first through said secondary N-th switch demand data detectors detect said secondary first through said secondary N-th switch demand data, respectively, said first through said N-th transmit switching circuits being for supplying said secondary first through said secondary N-th processed signals to said first through said N-th transmit output terminals, respectively, in at least one of cases where said primary first through said primary N-th abnormal signal detectors detect the primary abnormalities of said primary first through said primary N-th processed signals, respectively, and where said primary first through said primary N-th switch demand data detectors detect said primary first through said primary N-th switch demand data, respectively.

* * * * *